Oct. 22, 1963    H. T. McELVY    3,107,466
CASING MACHINE
Filed June 8, 1961    14 Sheets-Sheet 1

Inventor
Howell T. McElvy
By
McCanna, Morsbach & Pillote
Attorneys

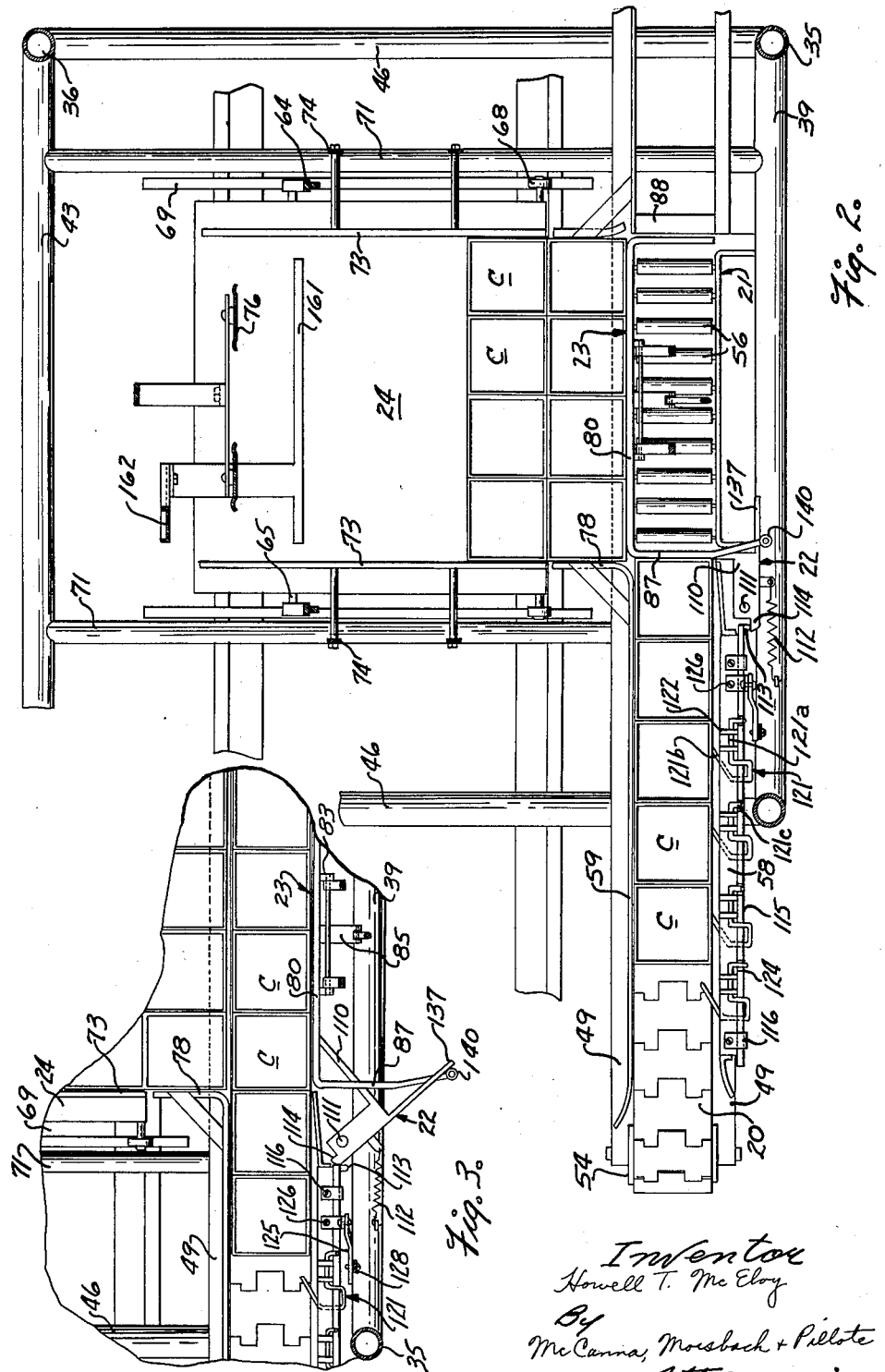

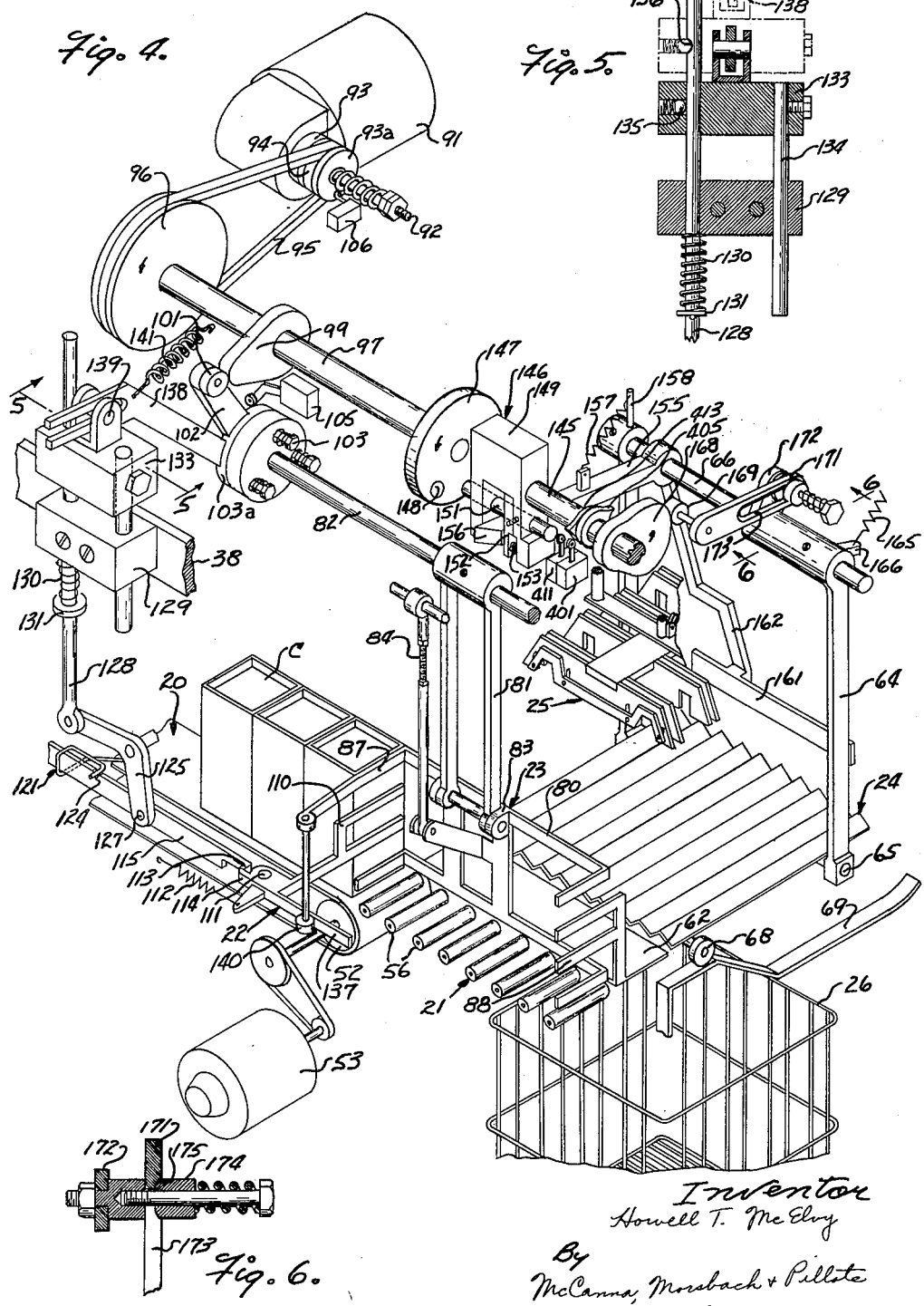

Oct. 22, 1963　　　　H. T. McELVY　　　　3,107,466
CASING MACHINE
Filed June 8, 1961　　　　　　　　　　14 Sheets-Sheet 4

Inventor
Howell T. McElvy
By
McCanna, Morsbach & Pillote
Attorneys

Oct. 22, 1963     H. T. McELVY     3,107,466
CASING MACHINE

Filed June 8, 1961     14 Sheets-Sheet 7

Inventor
Howell T. McElvy
By
McCanna, Morsbach & Pillote
Attorneys

Oct. 22, 1963  H. T. McELVY  3,107,466
CASING MACHINE
Filed June 8, 1961  14 Sheets-Sheet 8
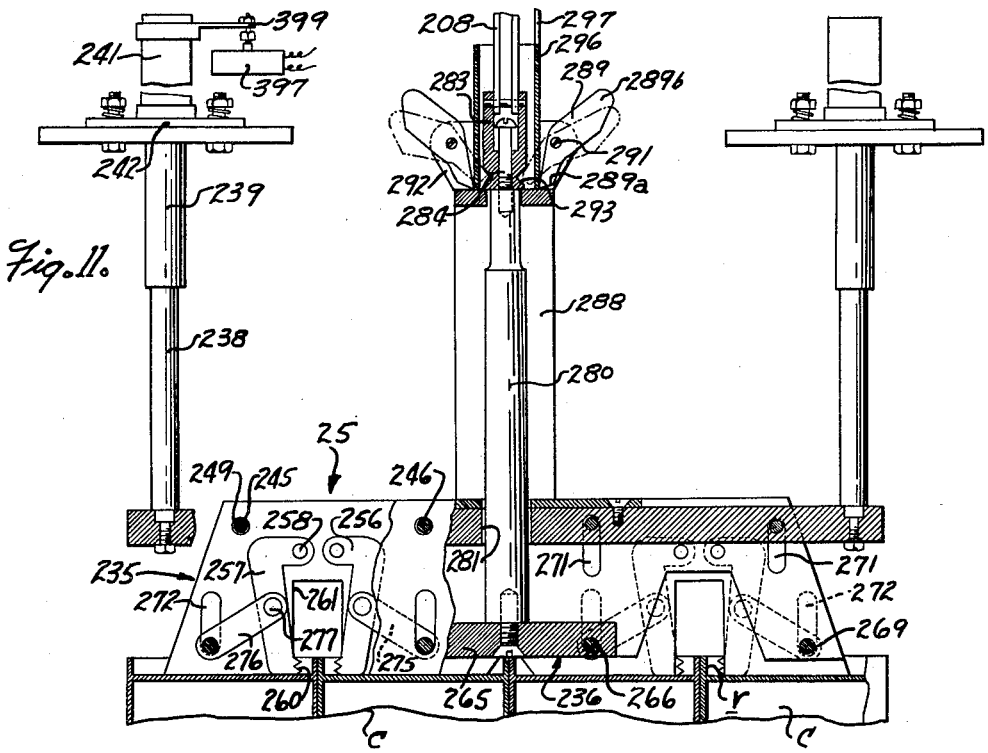
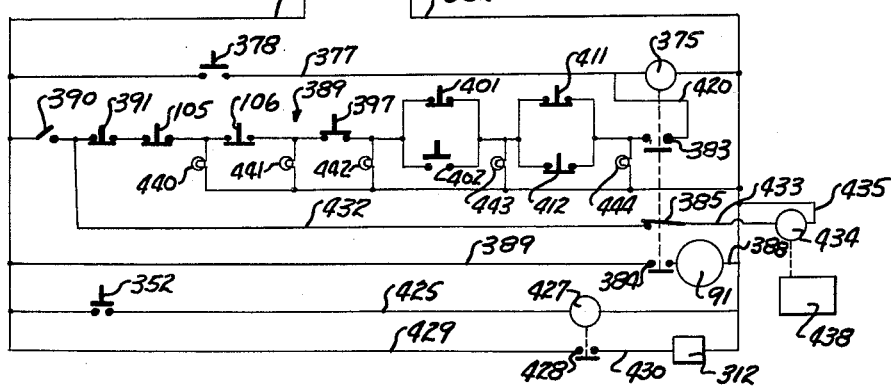
Inventor
Howell T. McElvy
By
McCanna, Morsbach & Pillote
Attorneys

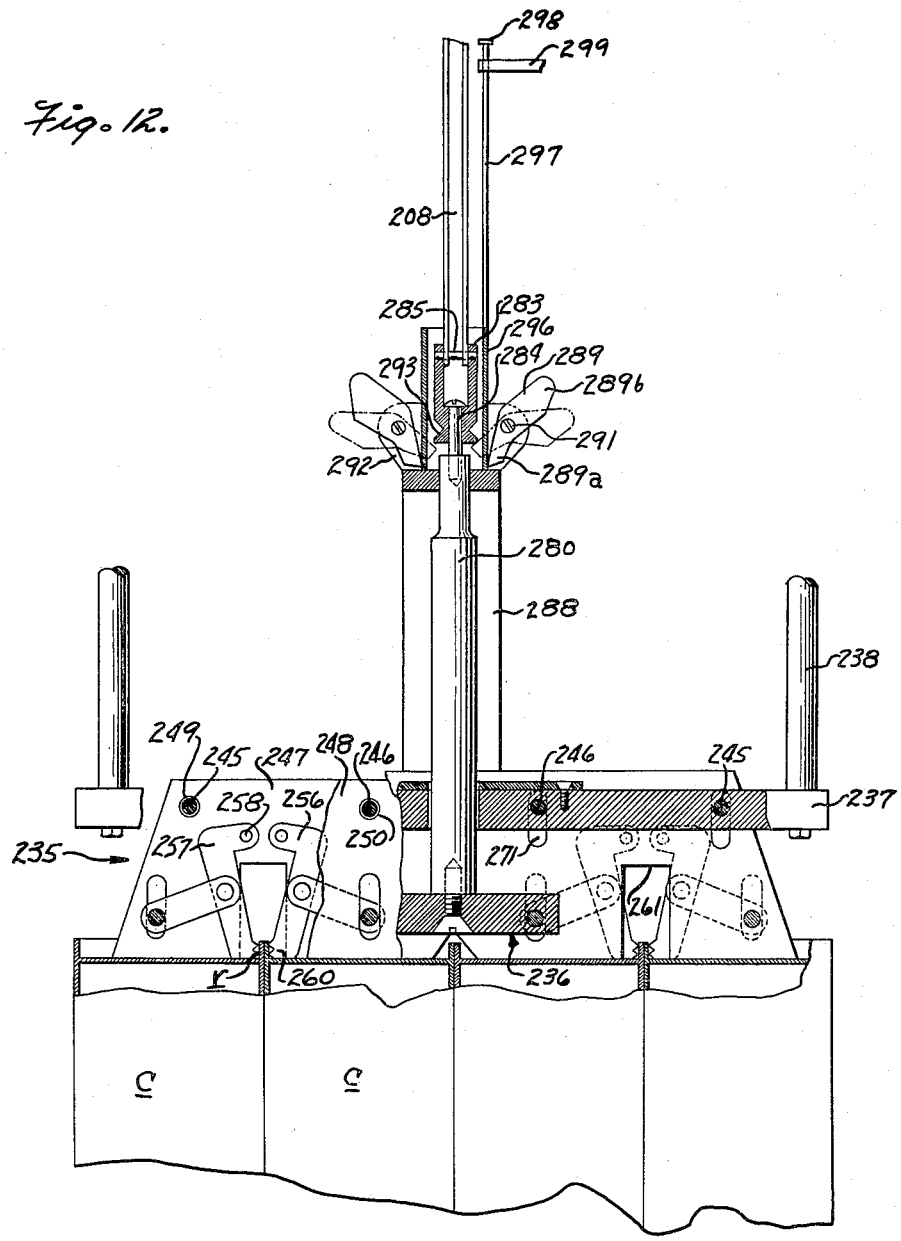

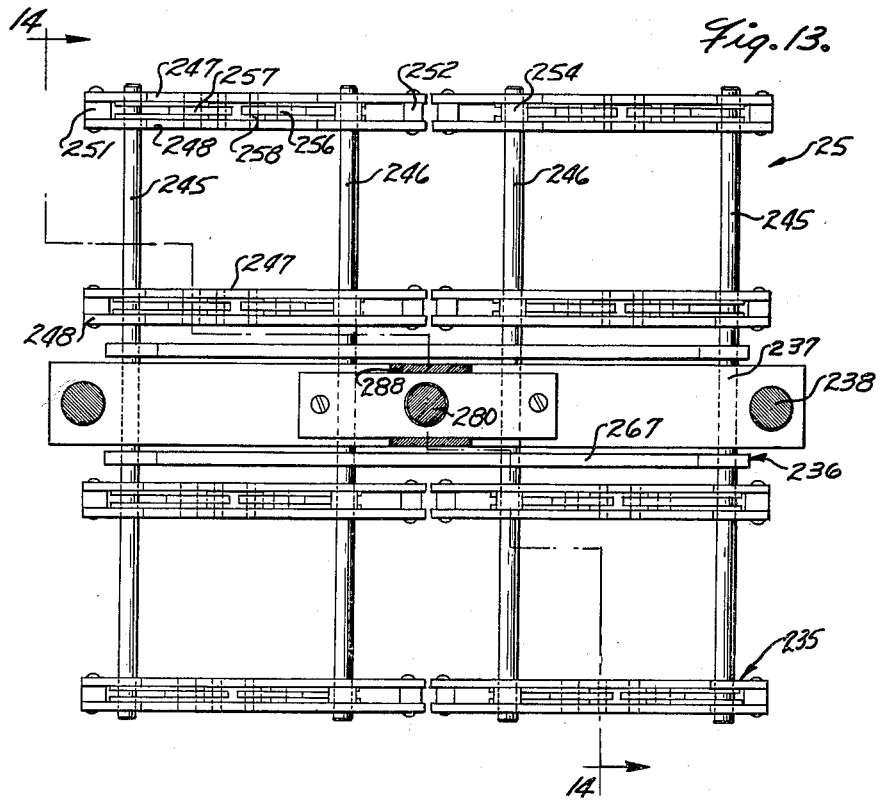
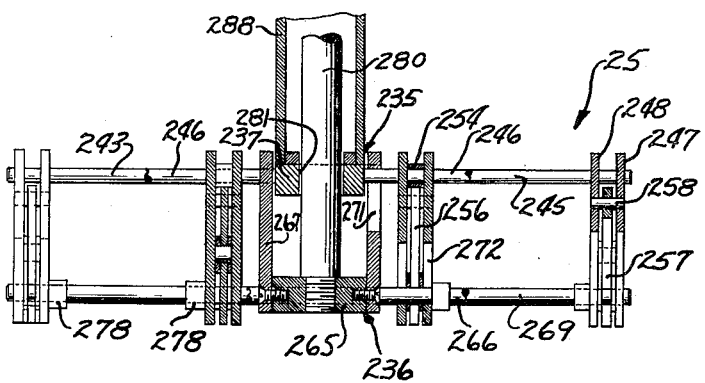

Oct. 22, 1963     H. T. McELVY     3,107,466
CASING MACHINE

Filed June 8, 1961     14 Sheets-Sheet 11

Inventor
Howell T. McElvy
By
McCanna, Morsbach & Pillote
Attorney's

Oct. 22, 1963  H. T. McELVY  3,107,466
CASING MACHINE
Filed June 8, 1961  14 Sheets-Sheet 12

Inventor
Howell T. McElvy
By
McCanna, Morsbach & Pillote
Attorney's

Oct. 22, 1963     H. T. McELVY     3,107,466
CASING MACHINE
Filed June 8, 1961     14 Sheets-Sheet 13
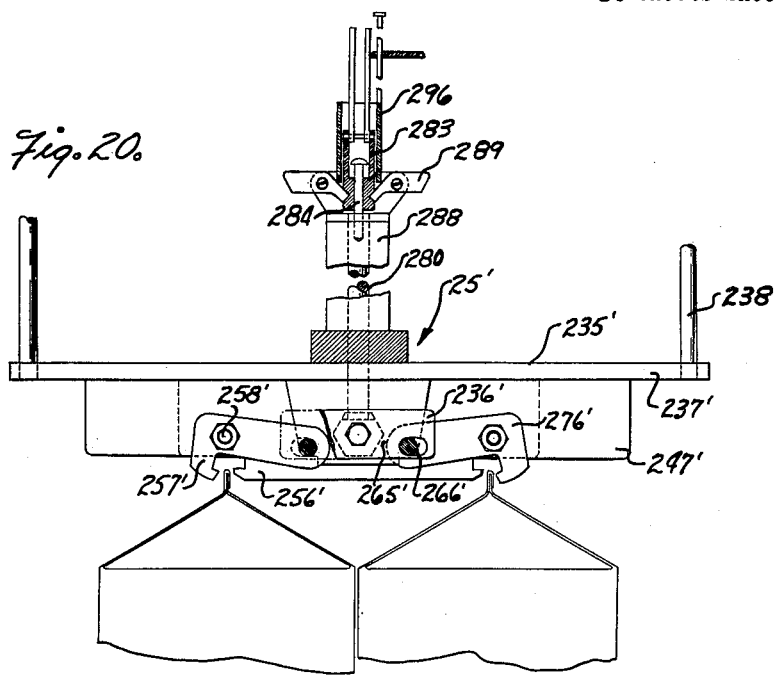
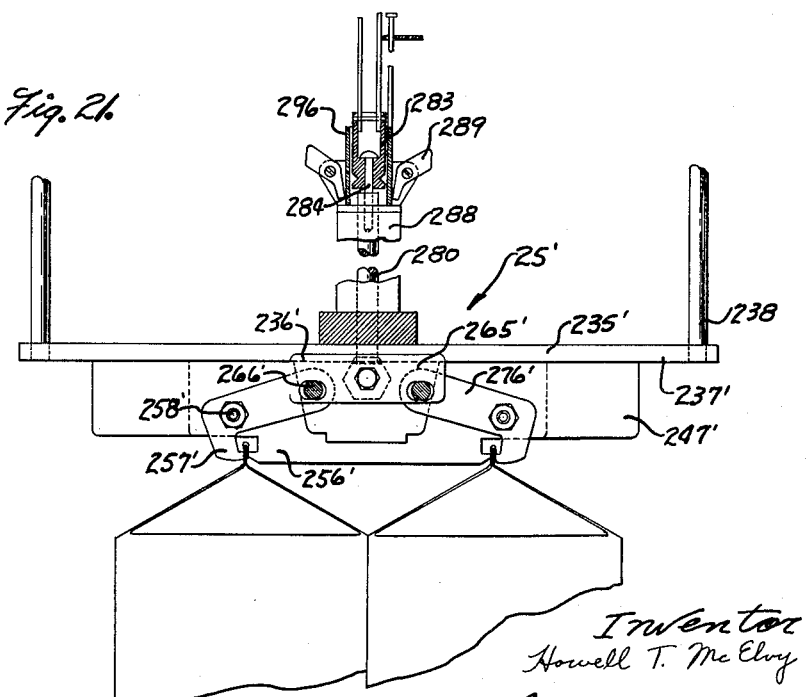
Inventor
Howell T. McElvy
By
McCanna, Morsbach & Pillote
Attorneys

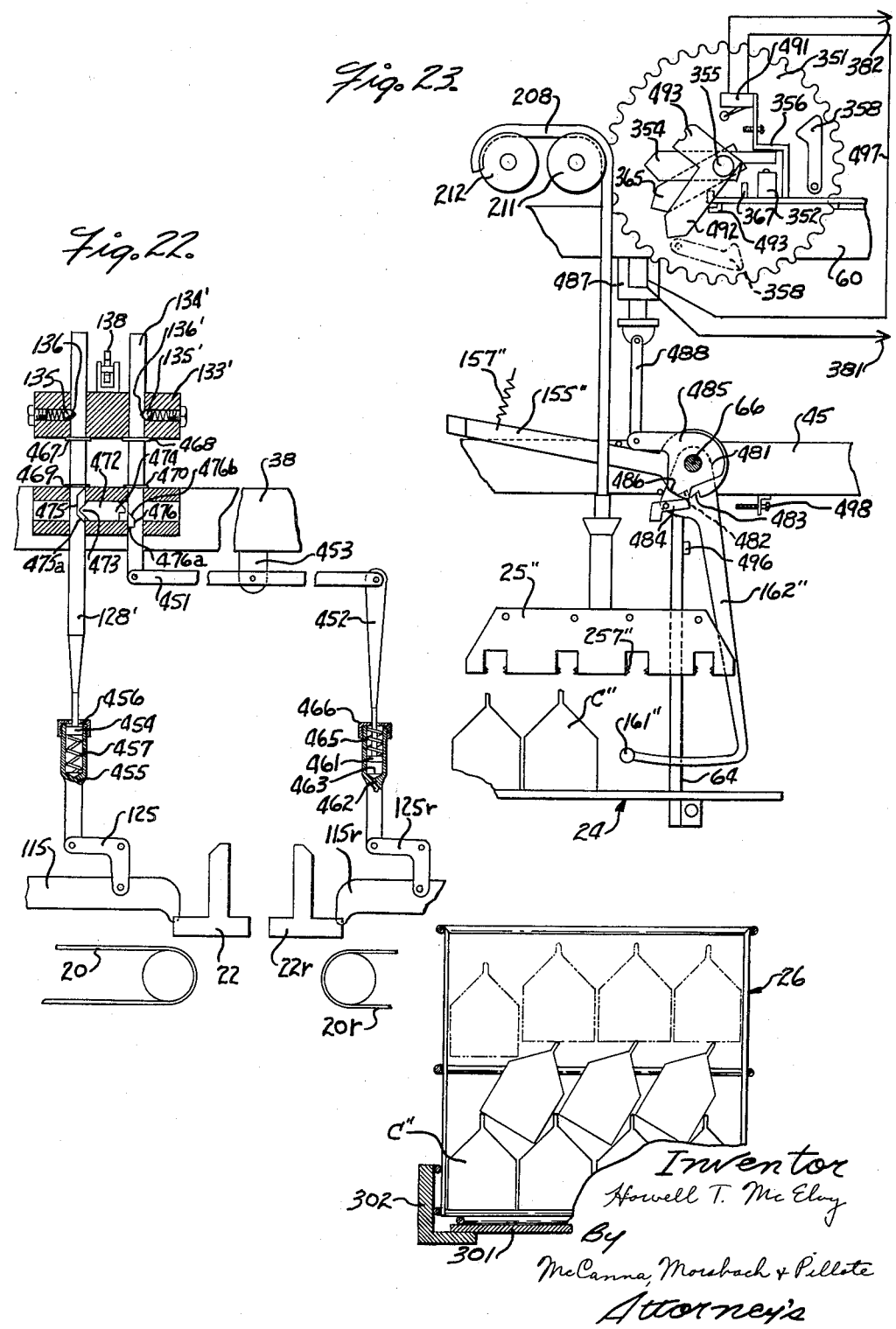

United States Patent Office 3,107,466
Patented Oct. 22, 1963

3,107,466
CASING MACHINE
Howell T. McElvy, R.R. 3, Box 60A, Guilford College,
Greensboro, N.C.
Filed June 8, 1961, Ser. No. 115,690
32 Claims. (Cl. 53—61)

This invention relates to machines for packing containers into cases and particularly to a casing machine of the type wherein the containers fed to the machine are sequentially transferred in groups onto a loading platform until a sufficient number accumulate to fill one layer in the case, and the entire stack of containers on the platform are then transferred from the platform and lowered into a case at a case loading station.

It is an important object of this invention to provide a case filling machine of the type described which will pack containers in a case at a high rate.

Another object of this invention is to provide a case filling machine which is readily adapted for packing containers of different sizes and shapes.

Another object of this invention is to provide a case filling machine which will automatically stack containers in a case in successive layers until the case is filled.

A further object of this invention is to provide a case filling machine which will automatically stack containers in successive layers in the case with relatively different numbers of containers in selected layers to facilitate nesting of the containers in the case.

Yet another object of this invention is to provide a case filling machine having an improved arrangement for elevating the container pickup head and which moves the head through a cycle in which the head is sequentially lowered into engagement with the containers at the container loading station; elevated to raise the containers off the loading station; and thereafter lowered to deposit the containers in a case.

Yet another object of this invention is to provide an improved container pick-up head in which the head has relatively movable container gripping jaws and the jaws are operated to their container engaging position in response to engagement of the head with the containers at the container loading station, and the jaws are moved to their released position in response to the containers coming to rest at the case loading station.

Still another object of this invention is to provide a case filling machine having a transfer means for transferring groups of containers onto a loading platform and a pickup head for loading containers from a platform into a case, and which machine has a novel drive employing a single drive motor for cyclically operating the transfer means in generally continuous fashion and for intermittently operating the head to elevate and lower the same in timed relation with the operation of the transfer means.

An additional object of this invention is to provide a case filling machine having a transfer means for transferring groups of containers onto a loading platform and a drive means for operating the transfer means in generally continuous fashion, together with a novel in-feed gate for controlling advance of containers to the transfer means, and which gate is operated in timed relation with the transfer means when the supply of containers in advance of the gate exceeds the number which are transfered by the transfer means.

A still further object of this invention is to provide a case filling machine which will automatically combine containers from two different filling machines and load the same in the case.

Other objects of this invention are to provide a case filling machine of the type described having transfer means for transferring groups of containers onto a loading platform and a pickup head for lowering the containers into a case, with means for preventing lowering of the head in the event a case is not in proper position below the head; if the head becomes tilted or otherwise does not properly enter the case; or in the event there is an overload on the transfer mechanism or the head elevating mechanism.

These, together with various ancillary objects and advantages of this invention will be more readily appreciated as the same becomes better understood by reference to the following detailed description when taken in connection with the accompanying drawings wherein:

FIG. 2 is a horizontal sectional view taken on the plane 2—2 of FIG. 1;

FIG. 3 is a fragmentary horizontal sectional view illustrating the parts in a moved position;

FIG. 4 is a diagrammatic perspective view illustrating the drive mechanism;

FIG. 5 is a sectional view taken on the plane 5—5 of FIG. 4;

FIG. 6 is a fragmentary sectional view taken on the plane 6—6 of FIG. 4;

FIGS. 10, 11 and 12 are views illustrating the container pickup head in different positions;

FIG. 13 is a plan view of the container pickup head;

FIG. 14 is a sectional view taken on the broken section line 14—14 of FIG. 13;

FIG. 15 is a schematic wiring diagram of the control circuit for the casing machine;

Figure 1:
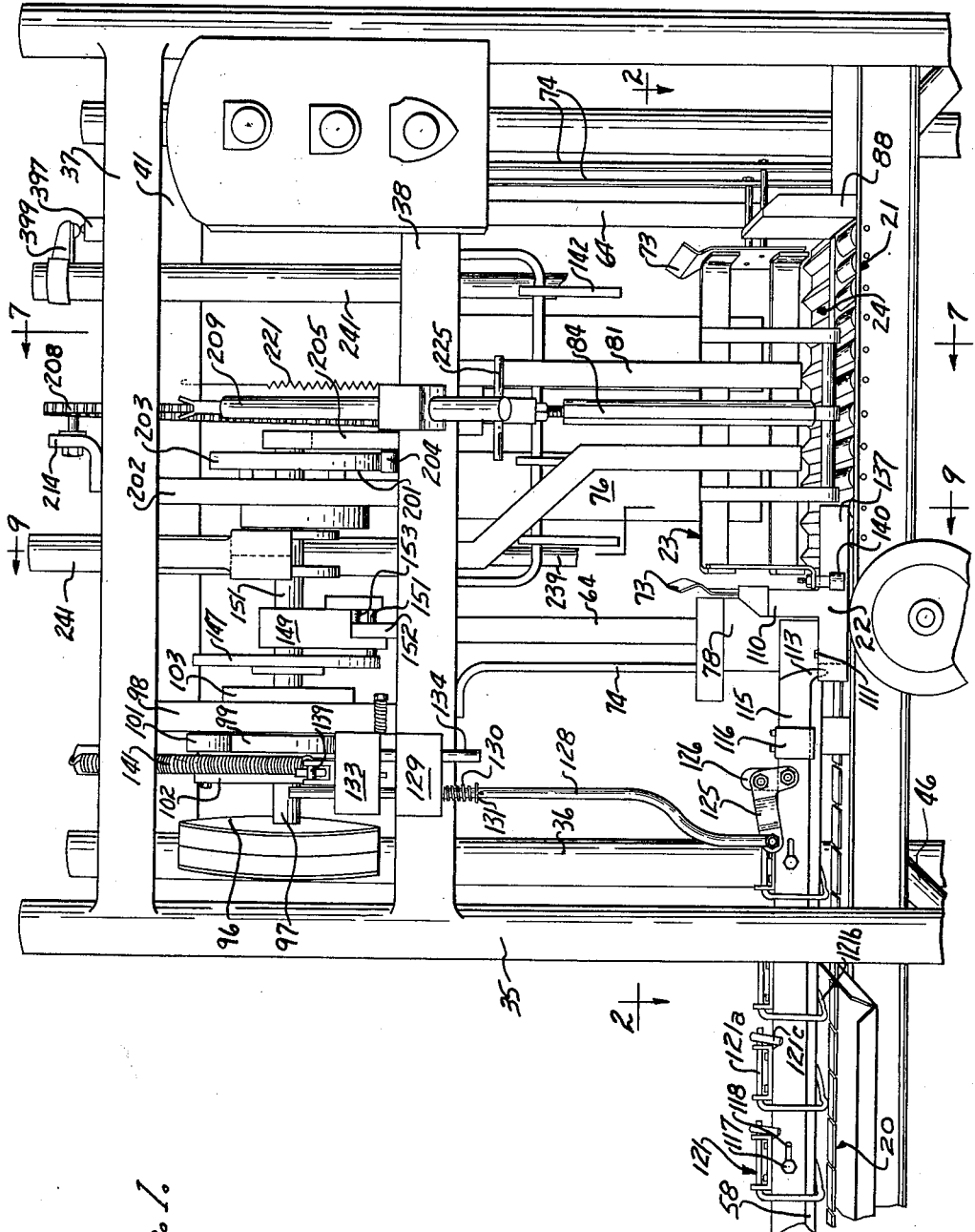
FIG. 1 is a partial front view of the container casing machine.

FIGS. 20 and 21 are sectional views through a modified form of container pick-up head and illustrating the parts in different moved positions; FIG. 22 is a fragmentary front view illustrating a modified form of machine having a dual in-feed gate; and FIG. 23 is a fragmentary vertical sectional view illustrating a modified form of machine having mechanism for stacking relatively different numbers of containers in successive rows in the case.

The container casing machine of the present invention in general includes an inlet conveyor 20 which advances containers C in a row to a container grouping station designated generally by the numeral 21. An in-feed gate 22 is provided for controlling the advance of containers to the grouping station 21 and a transfer mechanism 23 is mounted at the grouping station for movement crosswise thereof to transfer containers onto the container loading platform 24. A container pickup head 25 is normally positioned above the loading platform 24 and is operated to pick up the containers off the loading platform and to lower the same into a case 26 at a case loading station 27 located below the loading platform. As diagrammatically shown in FIG. 4, a drive mechanism is provided for operating the in-feed gate, the transfer mechanism, the head, and the loading platform all in timed relation with each other. A case conveyor 30 is provided for advancing cases into and out of the position at the case loading station, and container guides 31 are provided at the case loading station for guiding the containers into the case. In accordance with the present invention, the container guides are moved into and out of operative position in response to movement of the case.

Referring more specifically to the accompanying drawings, the container casing machine includes a main support frame which, in the form shown, includes front and rear sets of corner posts 35 and 36. The front posts 35 are interconnected by cross-frame members 37, 38 and 39, and the rear posts 36 are similarly interconnected by cross-frame members 41, 42 and 43. Side frame members 44, 45 and 46 interconnect the front and rear posts to form a rigid frame structure. Intermediate frame members 60, 67 and 71 extend between the front and rear frame members to support the casing mechanism. The inlet conveyor 20 extends along the front of the machine and is conveniently mounted on spaced channel-shaped rails 48 and 49. The front rail 48 is supported on the front posts 35 and the rear rail 49 is mounted by brackets 51 on the intermediate frame members 71. The conveyor is herein shown in the form of the endless belt type which advantageously terminates adjacent the end of the grouping station 21. As diagrammatically shown in FIG. 4, a conveyor drive drum 52 is located adjacent the inlet side of the grouping station 21 and is driven by a motor 53, and an idler drum 54 (see FIG. 2) is located adjacent the other end of the rails 48 and 49. In order to reduce the resistance to advancement of the containers to the grouping station 21, the floor of the grouping station is preferably in the form of a plurality of spaced rollers 56 which are disposed at the level of the top of the conveyor 20 and which form a continuation of the conveyor. Different types of conveyors may obviously be used and, if desired, the conveyor 20 could be extended completely across the grouping station 21. As best shown in FIG. 2, front and rear guide members 58 and 59 are disposed along opposite sides of the conveyor 20 for guiding the containers C therebetween.

Figure 7:
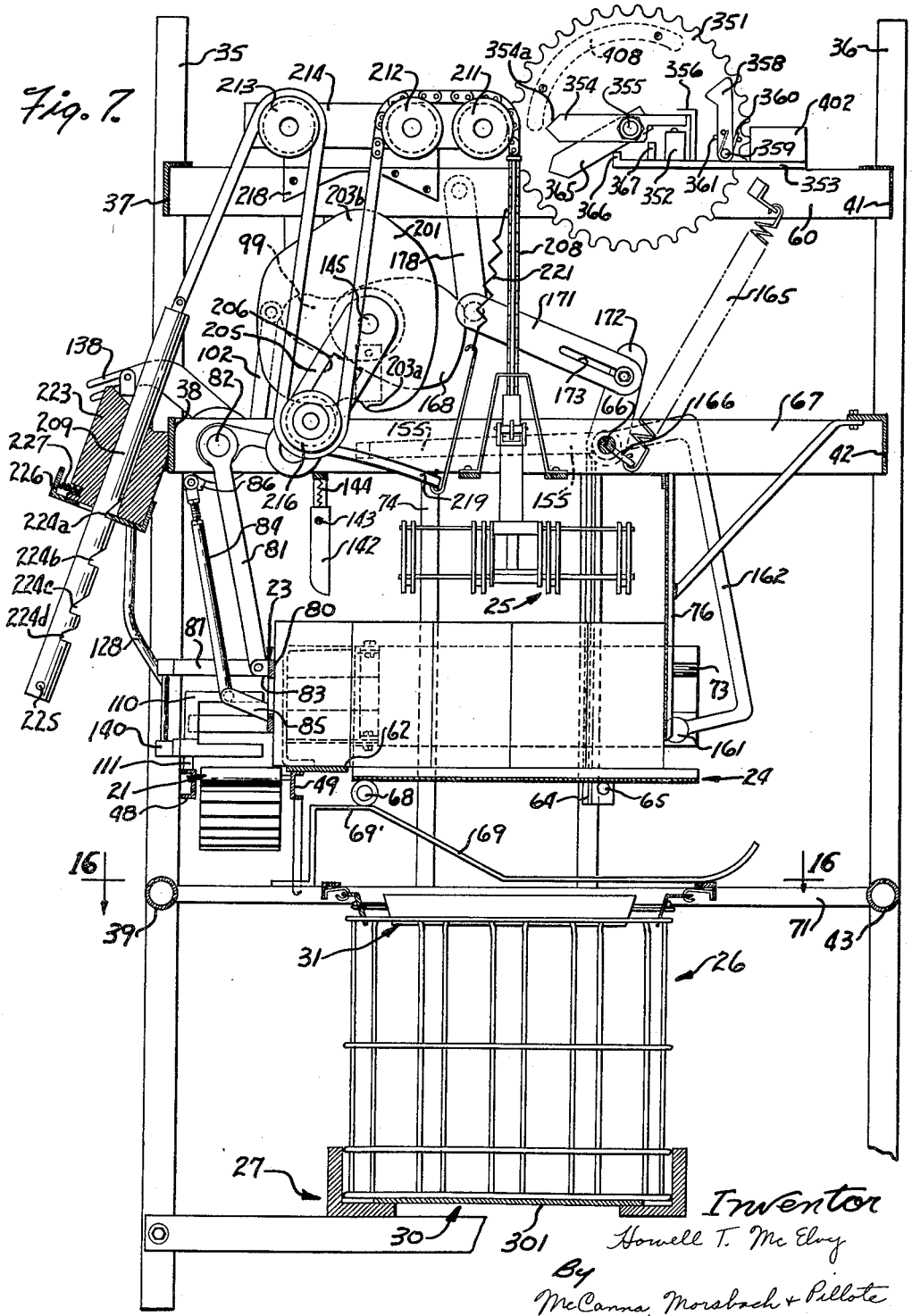
FIG. 7 is a vertical sectional view taken on plane 7—7 of FIG. 1.
Figure 8:
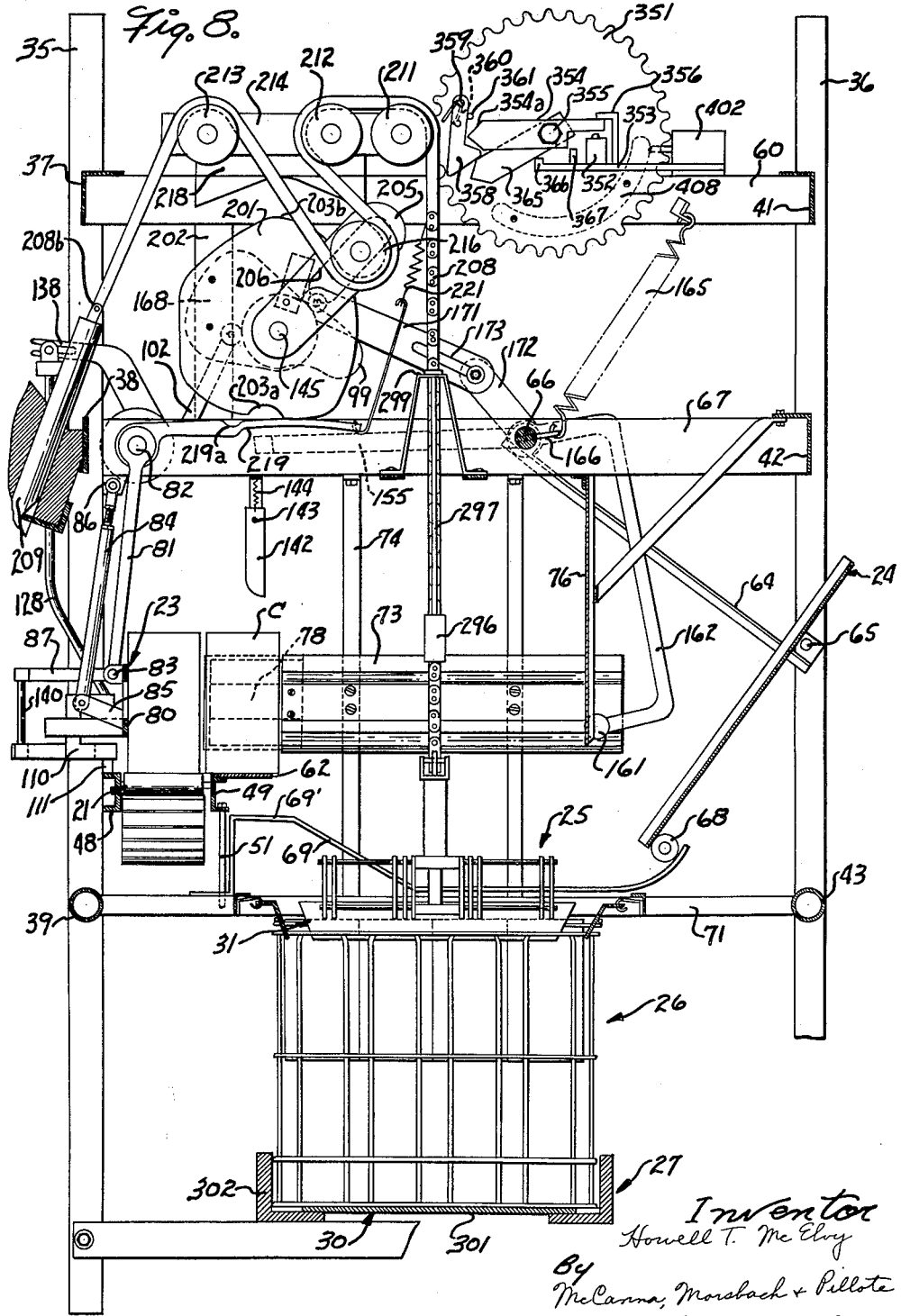
FIG. 8 is a vertical sectional view taken on the plane 7—7 of FIG. 1 and illustrating the parts in a moved position.
Figure 9:
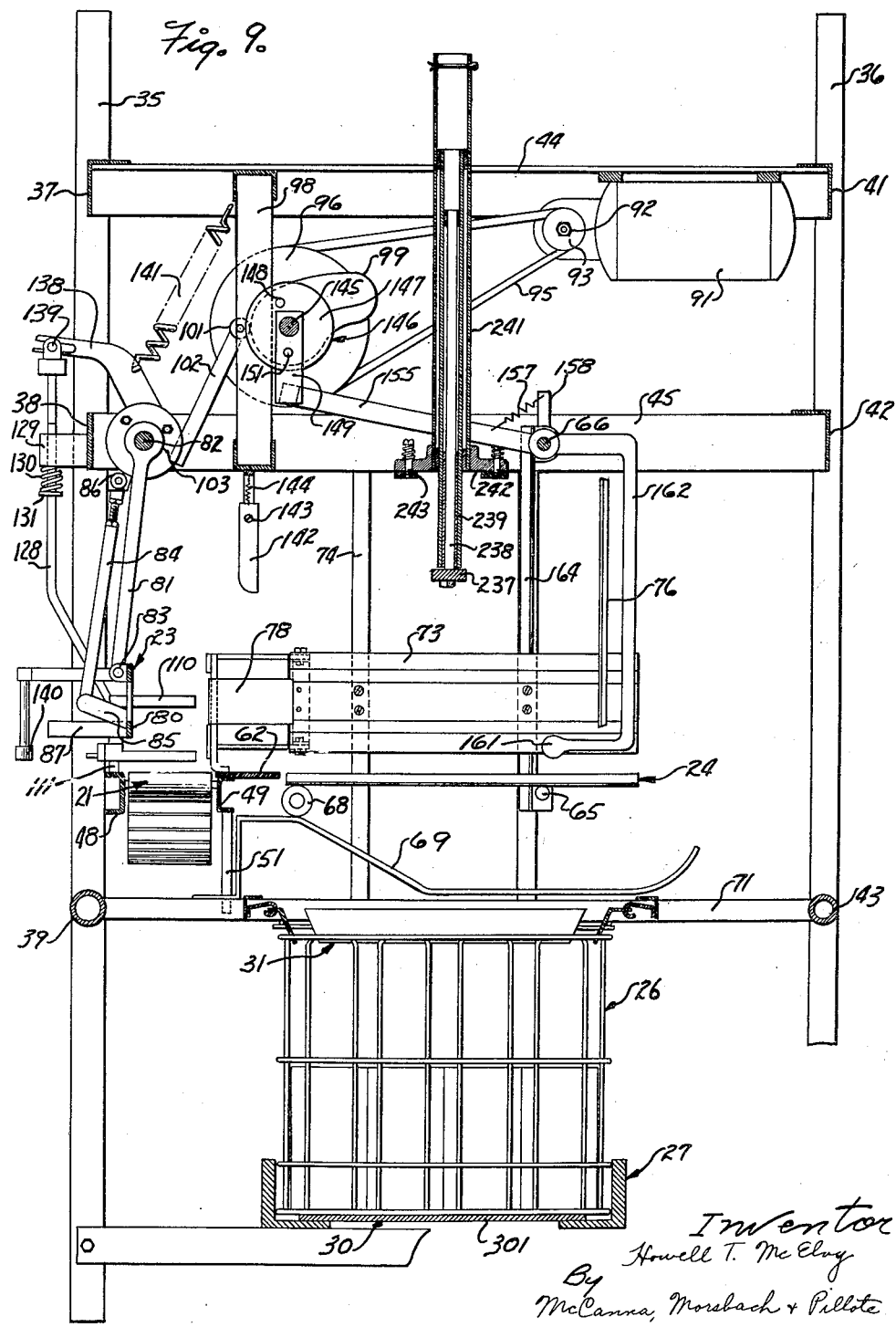
FIG. 9 is a vertical sectional view taken on the plane 9—9 of FIG. 1.

The container loading platform 24 is positioned alongside the grouping station 21. The platform is conveniently formed with a ribbed upper face to minimize frictional resistance to movement of the containers thereon and a guide plate 62 is disposed between the forward end of the platform 24 and the rollers 21 at the container stacking station to guide the containers onto the platform. The guide plate 62, as best shown in FIGS. 7-9, is conveniently mounted on the rear conveyor rail 49 and preferably has a width corresponding to the width of one row of containers to receive a group of the containers after they have been transferred off the grouping station. The loading platform 24 is mounted for movement into and out of its loading position shown in FIGS. 7 and 9 and, in accordance with the present invention, the loading platform is swingably supported adjacent its rear end by spaced arms 64 which are pivotally connected by a rod 65 to the platform and pivotally mounted on a shaft 66. The shaft 66 is located above the platform 24 and is rotatably supported in the spaced intermediate frame members 67 (see FIGS. 7 and 8). Support rollers 68 are mounted adjacent the forward end of the platform 24 and engages spaced trackways 69 carried by the intermediate frame members 71. As best shown in FIGS. 7-9, the trackways have a raised dwell portion adjacent their forward ends and extend downwardly and rearwardly therefrom. With this arrangement, the forward end of the platform is supported at the level of the plate 62, when the platform is in position to receive containers, and the forward end of the platform then moves downwardly as the platform is swung rearwardly to the position shown in FIG. 8, to provide clearance between the platform and the underside of the containers. Spaced guide plates 73 are mounted by straps 74 on the intermediated frame members 67 and 71 to laterally guide the containers as they are advanced onto the loading platform, and stop plates 76 extend downwardly from the intermediate frame members 67 adjacent the rear end of the platform 24 to stop the containers in proper position with respect to the case loading station 27 therebelow. As best shown in FIG. 2, the side guides 73 terminate adjacent the forward end of the loading platform 24 and guide shoes 78 extend crosswise of the plate 62 for guiding the containers C between the guide plates 73, as the containers are moved by the transfer mechanism 23.

*Container Transfer Mechanism*

The transfer mechanism 23 includes an elongated pusher member 80 having a length to be receivable between the guide shoes 78, and which member is movable crosswise of the container grouping station. The member 80 is preferably swingably mounted as by an arm 81 non-rotatably attached to a rock shaft 82. The rock shaft is rotatably supported in the intermediate frame member 67 and has the lower end thereof pivotally attached to an ear 83 on the pusher member 80. A longitudinally adjustable link 84 is pivotally attached at one end to an ear 85 on the pusher member 80 and at the other end to a bracket 86 on the main frame to form a parallelogram-type linkage with the arm 81 which maintains the pusher member 80 in a generally upright position as it is swung crosswise of the container grouping station. Stop bars 87 are provided at the ends of the member 80 to extend crosswise of the conveyor 20 when the pusher member 80 is extended, to prevent advancement of containers onto the grouping station. A container stop 88 is provided at the end of the container grouping station 21 opposite the conveyor 20 for stopping the group of containers after they have advanced to the grouping station.

While various different drives could be utilized for moving the transfer mechanism 23 to stack containers onto the loading platform 24, the drive is, in accordance with the present invention, arranged to oscillate the transfer mechanism across the grouping station 21 in generally continuous fashion, and the in-feed gate 22 is operated in timed relation with the movement of the transfer mechanism and in response to accumulation of an adequate number of containers on the conveyor in advance of the gate, to open the gate and allow the containers to be advanced to the grouping station 21. As shown in FIG. 4, a drive motor 91 has its output shaft 92 connected through an overload clutch 93 and drive pulley 94 to a belt 95 which drives a pulley 96 on a main drive shaft 97. The main drive shaft 97 is journaled in bearing brackets 98 (see (FIG. 1) attached to the main frame and a cam 99 is mounted on the shaft 97 for turning therewith. The cam 99 engages a follower 101 carried by an arm 102, and which arm is mounted on an element 103a of an overload release clutch 103. The clutch 103 is of the type which normally locks the follower arm 102 to the shaft 82 in a preselected angular position, and which will yield to permit the arm 102 to turn relative to the shaft, in the event the transfer member 80 engages an obstruction. As described hereinafter, provision is made for stopping the drive motor 91 in the event of an overload and, for this purpose, the clutches 93 and 102 are conveniently of the ball-detent or jaw type which produce a detectible axial separation of the clutch elements when the clutches slip. This axial movement is utilized to operate precision type switches designated 105 and 106. The motor 91 when energized, drives the main shaft 97 continuously and cyclically moves the transfer member crosswise of the container grouping station. However, the transfer member cannot operate to move any containers until the in-feed gate 22 opens to allow a group of containers to advance to the grouping station 21.

The in-feed gate 22 includes a gate member 110 which is swingably mounted on a pivot 111 for movement into and out of a position extending crosswise of the conveyor 20 adjacent the inlet of the grouping station 21. The gate member 110 is normally urged to an open position by a spring 112, and a latch 113 engages a keeper 114 on the gate member to releasably latch the same in a closed position, as shown in FIGS. 2 and 4. The latch member 113 is carried by an elongated latch bar 115 that extends alongside the inlet conveyor 20. The latch bar 115 is conveniently mounted on the front container guide rail 58 for limited relative movement longitudinally thereof. As shown, brackets 116 are attached to the guide rail 58 and extend around the latch bar 115 to slidably support the latch bar, and stop bolts 117 (FIG. 1) are attached to the guide 58 and extend through elongated slots 118 in the latch bar to limit longitudinal movement of the same. A plurality of individual operable container detector elements 121 are mounted on the guide member 58 at spaced points therealong and, preferably, the number of detector elements corresponds to the number of containers in each group to be transferred by the transfer mechanism. The detector elements are each similarly formed and include a mounting portion 121a rotatably supported in brackets 122 on the member 58, a detector finger 121b that projects into the path of movement of the containers C on the conveyor 20 and a latch finger 121c. The latch finger 121c is normally biased by the weight of the detector finger 121b into a notch 124 in the latch bar. When a container engages the respective detector finger, the associated latch finger 121c is swung upwardly and out of the notch 124. As will be noted, the detector fingers are positioned so that the number of containers which must accumulate on the conveyor 20 in advance of the in-feed gate, before the latch bar 115 is released, is in excess of the number which is advanced onto the grouping station 21. This arrangement is utilized to assure that some containers remain on the conveyor at all times to push the forward group of containers onto the rollers 56 which form the grouping station. Obviously, if the conveyor was extended completely across the grouping station, the gate could be opened each time the number of containers on the conveyor equalled the number in the group being transferred.

The latch bar 115 does not move to a position releasing the gate 22 immediately upon operation of all the latch fingers to their released position, but is instead operated in timed relation with the movement of the transfer member 80 to thereafter open the gage when the transfer member is retracted. As best shown in FIGS. 1 and 4, a bell crank 125 is pivotally mounted on a bracket 126 carried by the guide member 58. The bell crank has one end pivotally attached at 127 to the latch bar and a rod 128 is pivotally attached to the other end of the bell crank and slidably extends through a guide block 129 mounted on the front frame member 38. A spring 130 is disposed between the guide block 129 and a collar 131 on the shaft to normally urge the shaft downwardly and to yieldably urge the latch bar 115 to its latched position shown in FIGS. 2 and 4. A yieldable actuator is provided for moving the bar 128 upwardly, when the latch bar 115 is released. For this purpose, an actuator 133 is mounted as by a rod 134, for limited vertical movement relative to the guide block 129. The actuator 133 carries a ball detent 135 which is adapted to engage a notch 136 in the rod 128, to releasably latch the actuator to the rod. The actuator 133 is continuously reciprocated relative to the guide block 129 by means of a bifurcated arm 138 connected to the clutch element 103a for movement therewith. The bifurcated arm 138 engages a follower 139 on the actuator 133 and a spring 141 is attached to the arm 138 to normally urge the actuator 133 to its raised position while simultaneously urging the transfer member 80 to its retracted position. Thus, as the shaft rotates, the cam 99 operates the cam follower arm 92 to extend the transfer member 80 across the grouping station while simultaneously moving the actuator 133 downwardly. As the lobe of the cam 99 passes over the follower 101, the transfer member is retracted and the arm 138 simultaneously moves the actuator 133 upwardly. During the upward movement, the ball 135 drops into the notch 136 in the rod 128. If one or more latch fingers 121c engage the latch bar to prevent movement of the same to its released position, the ball detent 135 will merely pass out of the notch 136 without moving the latch bar. However, if all of the latch fingers are out of engagement with the latch bar, the ball detent latches the actuator 133 to the rod 128 and elevates the rod to move the latch bar to its released position. At that time the spring 112 operates to swing the in-feed gate to its open position and allow a group of containers to advance to the grouping station.

When the transfer member 80 thereafter is extended to transfer a group of containers from the grouping station 21 to the loading platform 24, a finger 140 on the transfer member engages an arm 137 on the in-feed gate to reclose the gate and, when the gate is closed, the latch 113 again operates to latch the gate in its closed position.

In order to inhibit tipping of tall containers as they are transferred from the grouping station under the plate 62, a plurality of stabilizer fingers 142 are swingably mounted at spaced points along a support bracket 143. The fingers are positioned to extend downwardly to engage the tops of the tall containers as they are moved off the grouping station, annd the fingers are yieldably urged to a downwardly extending position by springs 144 attached to the fingers at a point spaced above the bracket 143. The fingers are thus arranged to yield when they engage the top of the container to prevent the first group of containers from tipping over when the transfer member 80 comes to an abrupt stop at the end of its extension. The fingers apply a yieldable pressure against the tops of the containers to aid in maintaining the same in an upright position.

*Loading Platform and Head Drive Mechanism*

It is a feature of the present invention that the same drive motor 91 which operates the transfer mechanism and the in-feed gate, is also utilized to operate the loading platform to move the same out of the path of movement of the head 25. As diagrammatically shown in FIG. 4, an intermittently operated shaft 145 is operatively connected to the main shaft 97 through a one-revolution clutch 146. The shaft 145 is conveniently disposed coaxial with the shaft 97, and the one-revolution clutch 146 is of any conventional type. As illustrated, the one-revolution clutch includes a drive plate 147 connected to the main shaft 97 and having an eccentric opening 148 thereing. A clutch element 149 is non-rotatably connected to the shaft 145 and carries a drive pin 151 which is movable into and out of the opening 148 in the drive plate. A clutch operating finger 152 is attached to the pin 151 and a spring 153 yieldably urges the finger and pin in a direction to engage the opening 148 in the drive plate. The clutch 146 is conveniently mechanically operated, it being understood that it also can be electrically operated if desired. For this purpose, an arm 155 having a cam nose 156 at its outer end is mounted for movement into and out of the path of movement of the clutch operating finger 152 to selectively move the finger and pin 151 to a disengaged position. The arm 155 is conveniently supported on the shaft 66 and is rotatable relative thereto, and a spring 157 is attached to the arm to yieldably urge it to a position such as shown in FIG. 4 into the path of movement of the clutch operating finger 152. The spring 157 is preferably anchored to a bracket 158 (FIGS. 4 and 9) that turns with the loading platform arms 64 so that the spring tension on arm 155 is reduced when the loading platform 24 is moved outwardly as shown in FIG. 8 and increased when the loading platform is moved inwardly to the position shown in FIG. 7 and 9. A detector bar 161 is attached by a lever 162 to the arm 155 for movement therewith. Thus, when the loading platform is moved outwardly, the spring 157 does not operate to move the detector bar 161 to a position forwardly of the stop plate 76 where the detector bar might interfere with the movement of the head 25 and the containers carried thereby. However, when the loading platform is returned to its normal position shown in FIGS. 7 and 9, the spring 157 is tensioned to elevate the clutch operating arm 155 to its clutch disengaging position and to swing the detector base 161 to a position in front of the stop plates 76. The bar 161 and clutch operating arm remain in that position until the containers being stacked on the platform 24 engage the bar 161 and move the bar and the connected clutch operating arm 155 in a counter-clockwise direction as shown in the drawings out of engagement with the clutch operating finger 152. When the opening 148 in the drive plate thereafter moves into registery with the drive pin 151, the shaft 145 is operatively connected to the main shaft 97 for rotation therewith through one-revolution.

In the embodiment illustrated, the loading platform is yieldably urged to a retracted position shown in FIG. 8, and a cam operated mechanism is provided for moving the loading platform back to its loading position shown in FIGS. 4 and 7. For this purpose, a spring 165 is eccentrically attached to the shaft 66, by a bracket 166, to normally urge the loading platform to the position shown in FIG. 8. The cam mechanism for returning the platform includes a cam 168 attached to the shaft 145 for rotation therewith. The cam engages a follower 169 which operates through a link 171 and arm 172 on the shaft 66 to move the loading platform back to its loading position. In order to prevent damage to the machine in the event the loading platform strikes an obstruction, the link 171 is connected to the arm 172 through a yieldable connection. As best shown in FIG. 6, the link 171 is formed with an elongated slot 173 therein and the arm 172 is connected to the link through a yieldable detent-type clutch. A clutch member 174 normally seats in a recess 175 in the lever, to yieldably maintain the arm and lever in the position shown in the drawings. However, if the platform strikes an obstruction, the clutch member 174 can release and allow movement of the link 171 relative to the arm. It is then necessary to manually return the loading platform to its lower position, until the clutch member 174 reengages the recess 175. As shown in FIG. 7, the end of the link 171 which carries the follower 169 is swingably supported by a lever 178 attached to the main frame of the machine.

The head 25 for transferring the cartons from the loading platform to the case is operated in timed relation with the transfer means 80 and the movement of the loading platform 24. It is a feature of the present invention that the head elevating means is also operated by the shaft 145 so as to be driven by the same motor 91 which operates the transfer mechanism and the loading platform, to thereby assure operation of all the instrumentalities in proper timed relation. In accordance with the present invention, the head 25 is lowered into engagement with the containers on the loading platform 24, when the proper number of containers are stacked thereon, and the head is thereafter elevated to lift the containers off the loading platform and allow the platform to be moved from beneath the containers; lowered to deposit the containers in the case 26 at the loading station 27; and subsequently returned to its initial position above the loading platform 24. As best shown in FIGS. 7 and 8, the head elevating means include a stationary cam 201 which is secured by a bracket 202 to the main frame and which defines a cam track extending around the shaft 145. A cam follower 204 (see FIG. 1) engages the cam track and is moved therearound by an arm 205 which is non-rotatably attached to the shaft 145. The arm 205 has an elongated slot 226 therein, and the cam follower is slidably supported in the slot to permit the follower to shift radially of the arm as the arm rotates. The cam follower 204 is operatively connected to the head 25 through a flexible element, herein shown in the form of a chain 208. In order to facilitate handling of containers of different height, the follower is arranged to engage the chain intermediate its ends and, as shown, one end 208a of the chain is attached to the head 25 and the other end 208b is attached to an adjustable rod 209. The chain is entrained intermediate its ends over idler wheels 211, 212 and 213 supported by a bracket 214 on the main frame. A wheel 216 is attached to the cam follower 204 for movement therewith and engages a loop formed in the chain intermediate a pair of the idler sprockets such as 212 and 213. Thus, as the arm rotates, the cam follower 204 and the wheel 216 about the stationary cam track 203 and vary the length of the loop in the chain so as to raise the head when the cam follower moves downwardly, and to allow the head to lower under gravity as the cam follower moves upwardly. The cam follower is normally in the position shown in FIG. 7 when the one-revolution clutch 146 is disengaged, so as to support the head 25 in the raised position shown in that figure. The stationary cam track has a dwell portion 203a formed therein and which allows the cam follower 204 to move upwardly a distance sufficient to lower the head 25 into engagement with the containers on the loading platform. As the cam follower moves out of the dwell portion 203a it operates to raise the head and elevate the containers off the platform 24. The stationary cam track 203 also has a lobe 203b adjacent the top and which moves the cam follower 204 to its fully raised position to thereby lower the head 25 into the case. The present container casing machine is adapted for handling containers of different height, and the lobe 203b of the stationary cam is arranged so as to lower even the shortest containers handled by the machine to the bottom of the case 26. A stationary cam follower guide 218 is attached to the frame and overlies the lobe 203b of the cam track to maintain the cam follower 204 in engagement with the cam track as it rides over the upper portion thereof. A yieldable cam follower guide 219 is arranged to engage the cam follower 204 adjacent the underside of the cam track, to releasably hold the cam follower in its normal position, shown in FIG. 7, and which it occupies when the one-revolution clutch 146 disengages. The guide 219 also operates to press the cam follower upwardly into the recess 203a in the cam 203 when the arm 205 rotates, to provide sufficient slack in the chain 208 to lower the head 25 into engagement with the containers on the loading platform 24 and allow the containers to take the weight of the head off the chain. In the embodiment shown, the guide 219 is in the form of a lever conveniently pivoted on the shaft 82 and yieldably urged upwardly by a spring 221. As shown in FIG. 8, the lever 219 has a recess or dwell 219a for receiving the cam follower 204 when the latter is in its normal position. The rod 209 is adjustably attached to the frame and, as best shown in FIG. 7, is conveniently slidably supported in a block 223 attached to the cross member 38. The rod has a plurality of notches 224a–224d at spaced points therealong and a handle portion 225 for selectively moving the rod along the guide 223. A latch 226 is mounted on the guide and is yieldably urged by a spring 227 into one of the notches aligned therewith to anchor the rod against movement. With this arrangement, the effective length of the chain can be selectively changed to thereby adjust the initial position of the head 25 and thereby accommodate containers of different heights. Since the cam follower is connected to the shaft 145, the head elevating mechanism is operated only after the detector 161 trips the one-revolution clutch 146. At that time, the shaft is drivingly connected to the continuously rotating shaft 97 (FIG. 4) and the head elevating cam 201 and the platform moving cam 168 are arranged so that the head is lowered into engagement with the containers and then elevated to lift the containers off the platform before the platform is moved out from below the containers. The head is lowered while the platform is in the position shown in FIG. 8 to deposit the containers in the case and is subsequently returned to its initial position, at which time the platform 24 is returned to its normal position shown in FIG. 7.

Container Pick-Up Head

The container pickup head of the present invention includes relatively movable container gripping jaws and, in accordance with the present invention, a jaw operating mechanism is provided which is operative to move the jaws into container gripping position when the head is lowered into engagement with the containers at the loading platform 24, and for automatically moving the jaws to their released position when the containers are lowered into the case and come to rest therein. The arrangement of the jaws on the head will vary dependent on the configuration of the containers being packaged. The head illustrated in FIGS. 10-14 is arranged for handling sixteen containers of the type illustrated having a peripheral upstanding rim r at the top thereof. With containers of this type, pairs of containers can be gripped by their adjacent flanges so that only eight jaws are required to handle the sixteen containers.

The head 25 in general includes a jaw support frame 235 and a jaw actuator frame 236 which is mounted for limited vertical movement relative to the support frame. In the embodiment shown in FIGS. 10-14, the jaw support frame includes a main support bar 237 having guide rods attached to opposite ends thereof. The head is movable through a relatively long stroke and, conveniently, the guide rods are formed in a plurality of telescoping sections designated 238 and 239 (see FIGS. 9 and 11). The guide rod section 238 is slidable within the section 239 and the section 239 is slidably supported in a guide tube 241. The guide rods are provided primarily to inhibit turning of the head, as it is raised and lowered by the flexible member 208 and, for reasons set forth hereinafter, the mounting base 242 at the lower end of the guide tube 241 is resiliently mounted on a support bracket 243 to permit limited tilting and shifting movemt of the guide tubes relative to the frame as the head is raised and lowered.

Figure 10:
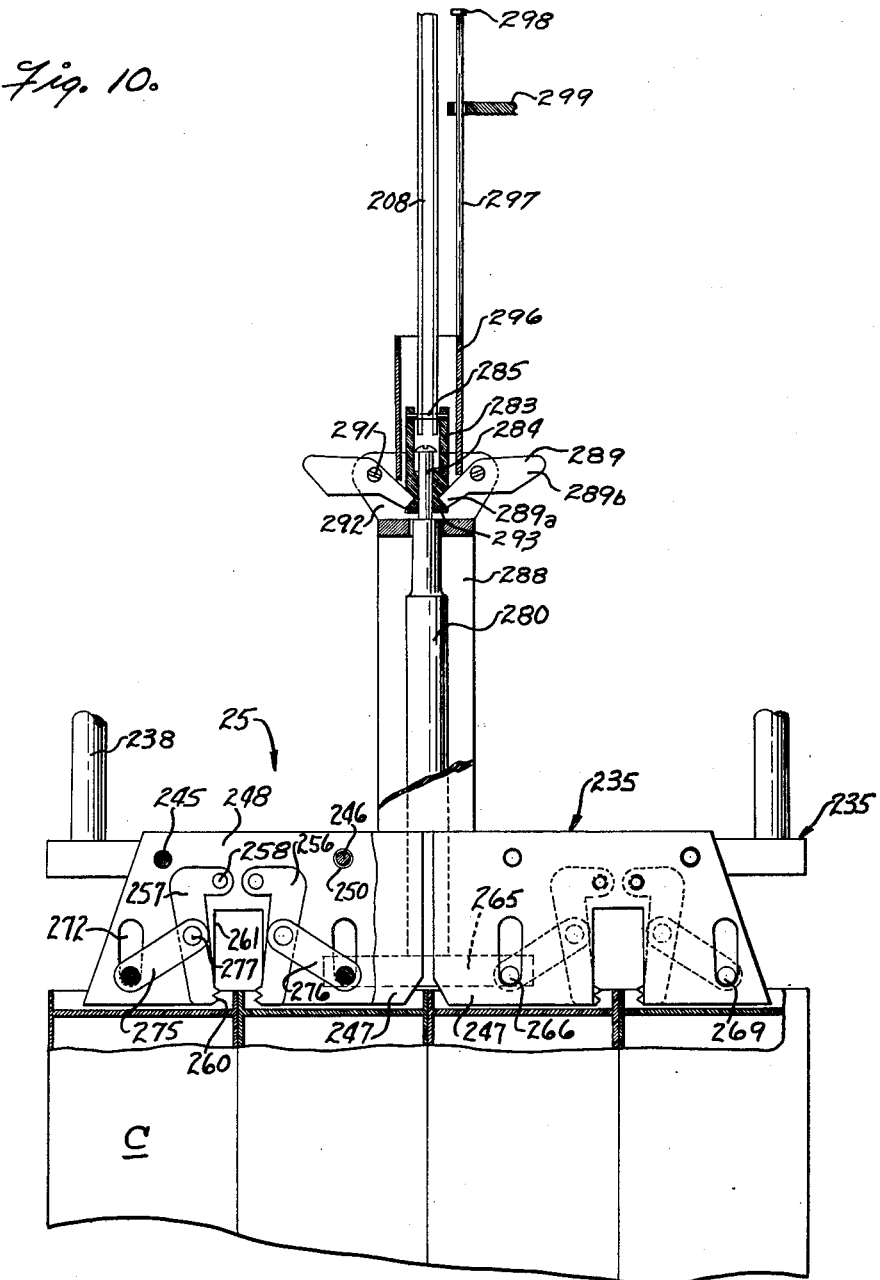
Figure 16:
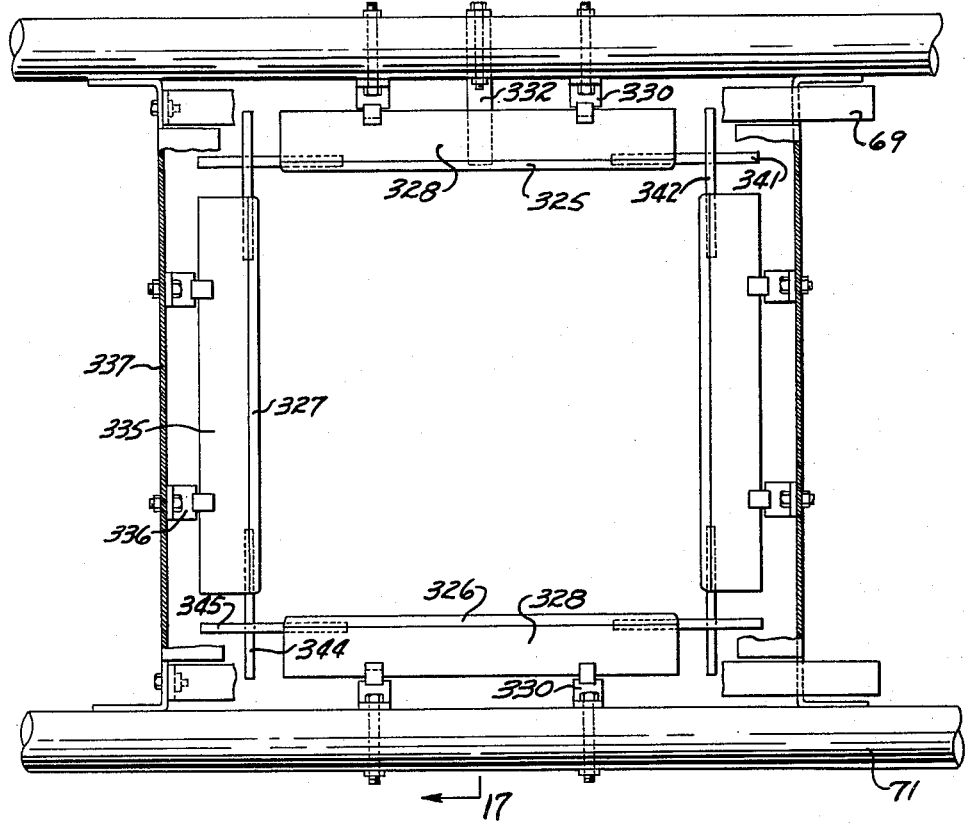
FIG. 16 is a fragmentary horizontal sectional view taken on the plane 16—16 of FIG. 6 and illustrating the arrangement for guiding containers into a case.

The several pairs of clamping jaws, herein shown eight in number, are similarly constructed and like numerals are utilized to designate corresponding parts. The clamping jaws are each conveninetly supported on spaced pairs of rods designated 245 and 246 and which are attached to the bar 237 and extend laterally therefrom. Each pair of container gripping jaws is mounted between spaced jaw mounting plates 247 and 248, and which plates have enlarged openings 249 and 250 respectively to loosely receive the rods 245 and 246 and support the plates thereon for limited shifting movement. The plates 247 and 248 are rigidly interconnected to each other and maintained in spaced relation by spacers 251 and 252 (see FIG. 13) and the plates are maintained in proper position along the rods by collars 254 attached to the rods 246. Container gripping jaws 256 and 257 are mounted between the plates for movement toward and away from each other and, as shown, both jaws are pivotally mounted on pins 258 attached to the plates 247 and 248. The jaws are preferably formed with serrated container gripping edges 260 at their lower ends and the plates 247 and 248 are formed with an upwardly extending opening 261 therein to permit the flange on the containers C to project upwardly between the jaws. The jaw actuating frame 236 includes a lower block 265 having a pair of spaced rods 266 extending laterally therefrom. Jaw actuator plates 267 are attached to the rods 266 and extend generally parallel to the jaw mounting plates 247 and 248 and a second pair of rods 269 are attached to the actuator plates 267 adjacent opposite ends. As previously mentioned, the jaw actuator frame is supported for limited vertical movement relative to the jaw mounting frame and, as best shown in FIG. 14, the jaw actuator plates 267 having elongated openings 271 therein to slidably receive the support rods 245 and 246 and the jaw mounting plates 247 and 248 have vertically elongated openings 272 therein which slidably receive the actuator rods 266 and 269. The actuator rods 266 and 269 are respectively connected to the jaws 256 and 257 by links 275 and 276, which links are pivotally supported on the respective actuator rods and are connected to pins 277 on the respective jaws. The links operate to open the jaws when the actuator frame 236 is moved downwardly relative to the jaw support frame as shown in FIG. 10 and to close the jaws when the actuator frame is moved upwardly relative thereto, as shown in FIG. 12. As best shown in FIG. 14, additional collars such as 278 are preferably provided on the actuator rods 266 and 269 and slidably engage the jaw mounting plates to aid in maintaining the same in proper position along the rods. A rod 280 is attached to the lower block 265 and is slidably supported in an opening 281 in the bar 237. A keeper block 283 is connected by a pin 284 to the upper end of the rod 280, for limited lost motion relative thereto, and the flexible member 208 is attached by a pin 285 to the upper end of the keeper block. With this arrangement, the weight of the head is suspended from the flexible member 208 which normally operates the rod 280 to move the actuator frame upwardly relative to the jaw support frame and thereby close the jaws, as shown in FIG. 12. Provision is made for selectively latching the jaw support frame to the jaw actuator frame, when the latter is in its lower position relative to the support frame, to lock the jaws in an open position. For this purpose, a bracket 288 is attached to the jaw support frame and extends upwardly therefrom, and one or more latches 289 are pivotally mounted by pins 291 on spaced ears 292 attached to the bracket 288. The latches 289 each have a nose portion 289a which is adapted to engage a notch 293 in the keeper block 283, when the actuator frame and the keeper block are lowered relative to the jaw support frame. The latch members are yieldably urged into their latched position, and, as shown, have counterweight portions 289b disposed at the side of the pivot axis 291 opposite the nose portion. A latch release cam is provided for preventing movement of the latches to their latched position when the head 25 is lowered into engagement wth the containers on the loading platform 24. As shown, the latch release cam is in the form of a sleeve 296 which loosely surrounds the latch block 288. The rod 297 is attached to the sleeve and has a head 298 at its upper end arranged to engage a stop 299 on the main frame (see FIGS. 7 and 8) to support the sleeve 296 when the head is lowered into the case. In use, the head is normally supported by the flexible member 208 at a level above the containers on the loading platform, with the latches 289 engaging the keepers 293 on the latch block 283 to normally latch the jaws in their open position. The interengaging faces of the latch 289 and keeper 293 is shaped so that the weight of the latch release cam 297 resting on the latches 289 is insufficient to move the latches to their released position, until the head is lowered into engagement with the containers on the loading platform 24 at which time the jaw support frame is supported by the containers. At that time, the latch block 283 moves downwardly to relieve the pressure applied to the nose portions of the latches, and the sleeve 297 is then effectively to move the latches to their released position shown in solid lines in FIG. 11. When the flexible member 208 is thereafter drawn upwardly, the latches 289 cannot engage the keepers 293 so that the actuator frame 236 moves upwardly to close the jaws, as shown in FIG. 12 to thereby grip the containers and elevate the same with the head. The jaws are thus urged to their closed position with a force proportional to the weight of the containers gripped by the jaws. When the containers come to rest in the case 26 at the case loading station, the jaw support frame is again supported by the containers and the actuator frame 236 moves downwardly relative to the support frame to move the jaws back to their open position. The head 298 on the rod 297 stops the release cam 296 before the head reaches its lowermost position so that the release cam is not effective to hold the latches in their open position. The latch fingers then move inwardly to a position such as shown phantom in FIG. 11 so that, upon subsequent elevating of the head, the latch fingers engage the keepers 293 to latch the jaws in their open position and thereby prevent raising the containers out of the case.

Case Loading Station

Figure 19:
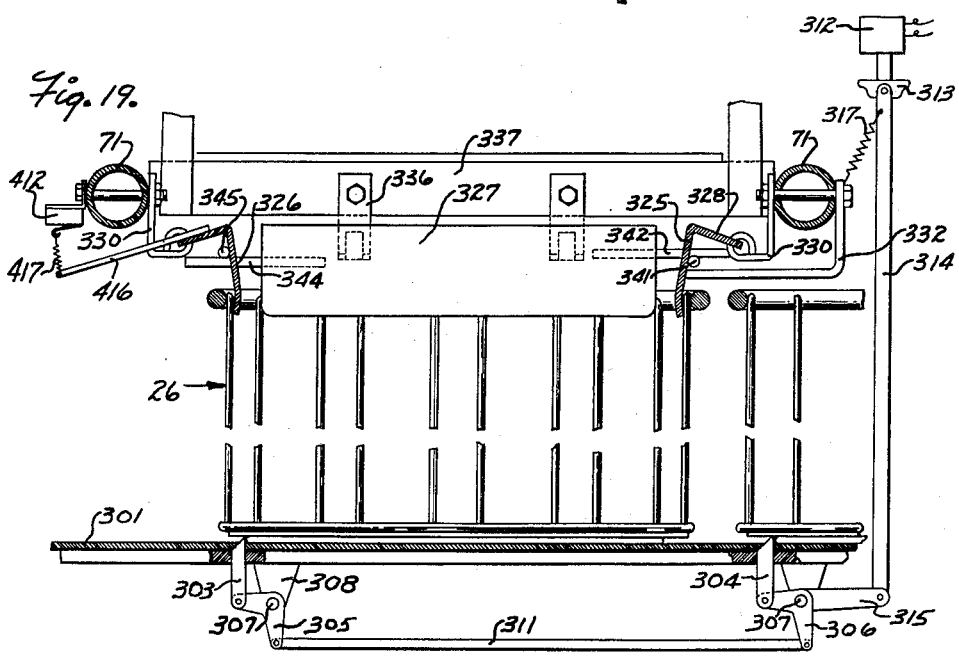

The cases 26 may be advanced to the case loading station 27 in any suitable manner, as by a case conveyor 301 herein shown in the form of a belt-type conveyor. Lateral guides 302 are provided for laterally positioning the case at the loading station and, as shown in FIG. 19, a stop 303 is provided for engaging a case 26 when it reaches the case loading station 27 to stop the same in position and, preferably a second stop 304 is provided for stopping a succeeding case at a position somewhat advanced of the case loading station. As diagrammatically shown in FIG. 19, the stops 303 and 304 are reciprocably mounted for movement into and out of the path of movement of the cases on the conveyor and are operated by means of bell cranks 305 and 306 which are supported on shafts 307 mounted on the frame by brackets 308. The bell cranks 305 and 306 are conveniently interconnected by a link 311 for operation in unison and a common operator, herein shown in the form of a solenoid 312 having an armature 313 is connected to the bell cranks through a link 314 and an arm 315. The stop dogs 303 and 304 are normally urged to their case engaging position, as by a spring 317 and are selectively moved to their released position by the aforementioned solenoid.

Figure 17:
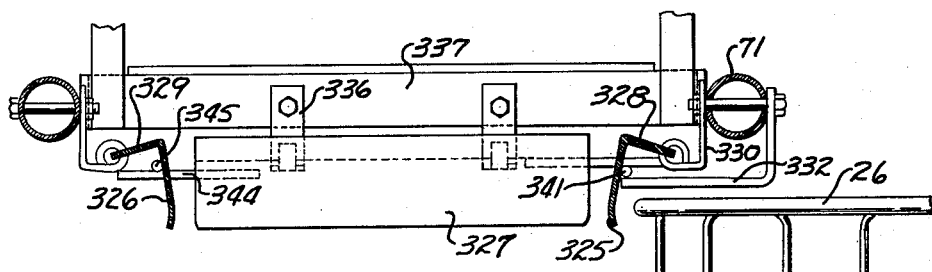
FIGS. 17, 18 and 19 are fragmentary sectional views taken on the plane 17—17 of FIG. 16 and illustrating the container guides in different moved positions as a case is advanced into position therebelow.
Figure 18:
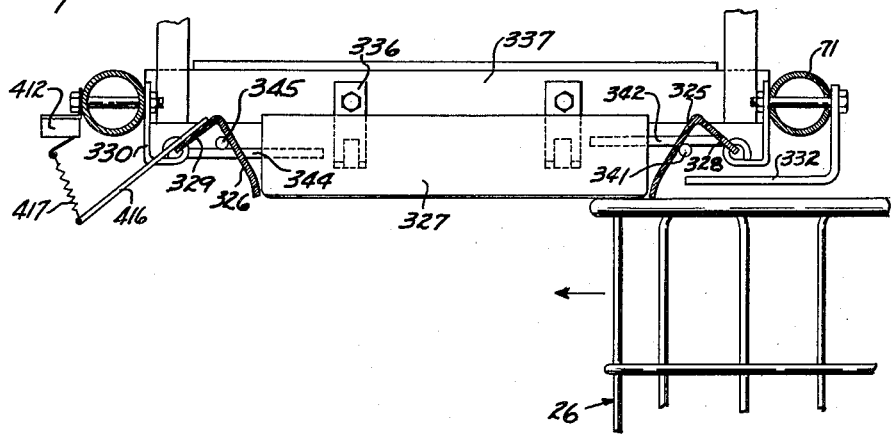

Provision is made for guiding the containers into the case, as the head is lowered, to assure proper loading of the case. As best shown in FIGS. 16-19, the container guides include front and rear guide flaps 325 and 326 and spaced side guide flaps 327. The front and rear guide flaps 325 and 326 are supported for vertical swinging movement about an axis extending crosswise of the path of movement of the cases 26, and which axes are spaced apart a distance greater than the length of the case. As shown, the front and rear flaps have offset portions 328 and 329 at their upper ends which are supported in brackets 330 attached to the lower frame members 71. A stop arm 332 is attached to the frame member 71 and engages the front flap to limit downward swinging movement of the same, as is best shown in FIGS. 17 and 19. The spaced side flaps 327 are similarly shaped and have a laterally extending portion 335 at their upper ends which is swingably supported by brackets 336 for vertical swinging movement about an axis extending generally longitudinally of the path of movement of the case 26, and spaced outwardly from opposite sides thereof. The side brackets are mounted on cross members 337 attached to the frame members 71 and extending therebetween. The container guide flaps are arranged to project into the case to assure proper guiding of the containers thereinto and the stop arm 332 stops the flaps with the lower edges thereof extending to a level below the tops of the cases as they are advanced along the conveyor. When the leading edge of the case engages the front flap 325, it swings the same upwardly until the flap clears the top of the case. The front flap 325 has laterally extending fingers 341 which extends from opposite ends and underlie laterally extending fingers 342 which extend from the forward ends of the side flaps 327. The upward swinging of the front flap thus raises the side flaps 327 therewith, as shown in FIG. 18 and, the side flaps 327 have fingers 344 adjacent their trailing ends which underlie fingers 345 projecting from opposite ends of the rear flap 326, to also swing the rear flap upwardly with the side flaps. When the front flap 325 passes over the front edge of the case 26, it can drop thereinto. However, the side flaps 326 ride along the top of the loading edge of the case and maintain the rear flap in its raised position until the case is stopped in proper position therebelow. At that time, the flaps swing downwardly into the case as shown in FIG. 19 to guide the containers thereinto. When the case stop bars 303 and 304 are subsequently released, the trailing edge of the case will push the front flap 325 upwardly to simultaneously elevate the side and rear flaps 327 and 326 and thereby clear the top of the case.

Control Circuit

Provision is made for automatically operating the case release solenoid 312 when the case is filled with containers, to enable the succeeding empty case to advance to proper position at the loading station 27. In the present filling machine, the head moves downwardly until the containers carried by the head come to rest in the case. When the layer of containers deposited in the case by the head fills the case, the downward movement of the head is arrested adjacent the top of the case. In accordance with the present invention, a mechanism is provided for automatically operating the case release solenoid when the downward movement of the head is arrested adjacent the top of the case, as occurs when the case is filled. As shown in FIGS. 7 and 8, a sprocket 351 is rotatably mounted on a shaft 355 in meshing engagement with the flexible member 208 to turn through an angle correlative with the travel of the flexible member. A switch 352 is mounted on a bracket 353 alongside the sprocket and a switch operating lever 354 is mounted for turning about the shaft 355 for operating the switch 352. The lever 354 normally rests against a stop 356 and is spaced from the actuator of the switch 352. A dog 358 is pivotally mounted by a pin 359 on the sprocket for turning movement therewith and is normally urged by a spring 360 against a stop pin 361. The dog is cammed outwardly by engagement with the nose portion 354a on the lever 354, as the sprocket moves in a counter-clockwise direction as viewed in FIGS. 7 and 8, during lowering of the head. A release lever 365 is also mounted for swinging movement about the shaft 355 and has a length slightly greater than the length of the lever 354. The release lever 365 normally rests against the stop 366 which supports the release lever in a position angularly advanced in the direction of rotation of the sprocket from the actuating lever 354. When the head 25 moves substantially below the top of the case, the dog 358 moves with the sprocket to a position beyond the release lever 365. When the head is thereafter raised and the sprocket turns in a clockwise direction, the release lever turns wtih the dog 359 until the release lever becomes aligned with the actuating lever and engages the second stop 367. The release lever then operates to cam the dog out of the path of movement of the actuating lever 354 so as to prevent operation of the switch 352. If however, the head stops in a position adjacent the top of the case 26, the dog 358 is arranged to stop in a position intermediate the actuating lever 354 and the release lever 365, as shown in FIG. 8. When the head is thereafter raised, the dog moves the actuating lever 354 with the sprocket and operates the switch 352. The switch 352 is arranged in a manner described hereinafter, to operate the case release solenoid.

The control circuit for operating the machine is diagrammatically illustrated in FIG. 15. As shown therein, the main control relay 375 is connected in a series circuit 377 with a start switch 378 to power conductors 381 and 382. The control relay, when energized, closes the normally open switches 383 and 384 and opens the normally closed switch 385. The main drive motor 91 is connected in a series circuit 388 including normally open switch 384 to the power conductors 382 and 381 so that the main drive motor is started in response to closing of the start switch 378. The start switch 378 is of the normally open type and a holding circuit 389 is provided for maintaining the control relay 375 energized when the starting switch 378 is released. This holding circuit 389 includes a plurality of safety switches connected to the power conductor 381 and to the main control relay 375 to maintain the control relay energized under the control of the safety switches. In particular, the holding circuit includes a manually operable "run"

switch 390 which is arranged to be manually closed at the time the machine is started, and a "stop" switch 391 which stop switch is normally closed and arranged to be manually opened to stop the machine, when desired. The holding circuit also includes safety switches 105 and 106. The switch 105 is normally closed and, as previously described, is arranged to be operated in response to slipping of the clutch 103 in the drive to the shaft 82, to prevent overloading the device in the event the transfer mechanism engages an obstruction. The normally closed switch 106 is operated by the main drive clutch 93, in the event the main clutch slips as would occur in the event of an overload anywhere in the machine. A safety switch 397 is connected in the holding circuit and, as shown in FIG. 10, the switch 397 is mounted adjacent one of the guide tubes 241 for the head 25. The switch 397 is of the normally open type, and a finger 399 is mounted on the upper end of the guide tube 241 and engages the actuator for switch 397 to normally hold the same closed. As previously mentioned, the lower ends of the tubes 241 are mounted for limited shifting movement so that the finger 399 will disengage the switch actuator if the head 25 becomes tilted or cocked for any reason, such as would occur if the head engaged one side of the case and did not properly enter the same.

Provision is also made in the holding circuit for interrupting operation of the machine in the event the container transfer head 25 does not properly enter the case 26. This is achieved by switches 401 and 402 which are connected in parallel with each other and in series with the holding circuit. The switch 401 is operated by a cam 405 on the secondary drive shaft 145. This switch is normally closed and is opened when the secondary drive shaft turns to a position in which the head would be normally lowered into the case 26. Switch 402 is normally open and is mounted adjacent the sprocket 351 (see FIGS. 7 and 8) and is operated by a cam 408 on the sprocket. The cam 408 is arranged to engage the switch 402 and close the same when the head is lowered to a position to enter the case and to maintain the switch 402 closed as the head is lowered below the top of the case and until it is lifted out of the case. If, for any reason the head does not enter the case, the sprocket will not turn to a position such that the cam 408 will operate the switch 402. Consequently, when the switch 401 is opened by the cam on the shaft 145, the holding circuit will be opened. Conversely, if the head does enter the case properly, the switch 402 will be closed at the time the switch 401 is opened, to maintain the holding circuit.

The holding circuit also advantageously includes an arrangement for interrupting operation of the machine in the event a case is not in proper position at the case loading station 27, at the time the head starts its downward movement. This arrangement includes a normally closed switch 411 and a normally closed switch 412 connected in parallel to each other and in series with the holding circuit. The switch 411 is operated by a cam 413 on the shaft 145 and is arranged to be opened by the cam after the shaft has turned through a preselected angle and the head starts its downward movement. The switch 412 is mounted adjacent the container guide flaps and, as shown in FIGS. 18 and 19 is mounted on one of the frame members 71. The switch is operated by an arm 416 attached to one of the flaps, such as the rear flap 326, through a yieldable connection such as a spring 417. The switch is normally closed and is opened whenever the flaps are out of their position. Consequently, if a case 26 is not in proper position, the flaps will be elevated as shown in FIG. 18 and open the switch 412. If the switch 412 is open at the time the head starts its downward movement and the switch 411 is open, the holding circuit is interrupted. The normally open contacts 383 of the control relay 375 are connected in the aforementioned holding circuit. Thus, when the start switch 378 is closed, the control relay 375 closes the holding circuit thereto so as to maintain the control relay energized when the start switch 378 is opened. The holding circuit maintains the control relay energized so long as no malfunction occurs.

The switch 352 which operates the case release solenoid 312 is connected in a series circuit 425 with a case release relay 427 to the power conductors 381 and 382. The relay 427 is of the time delay type and controls contacts 428 which are connected in a series circuit 429 with the case release solenoid 312 to the power conductors 381 and 382, to thereby energize the solenoid when the switch is closed and maintain the solenoid energized for a time interval sufficient to permit the filled case to move part way out of position at the case loading station. As previously described, the switch 352 is closed only when the head is lowered to a preselected position relative to the top of the case, indicative of the case being filled. In order to stop the feed of containers to the casing machine, in the event of a malfunction in the casing machine, the normally closed contacts 385 of the control relay 375 are advantageously connected in a circuit including conductors 432 and 433, relay 434 and conductor 435 to the power conductors 381 and 382. The relay 434 is thus energized when the control relay 375 drops out and the relay 434 is used to operate a control diagrammatically indicated at 438 for stopping the filling or other machine which supplies the containers to the casing machine. A plurality of pilot lamps 440—444 are connected to the holding circuit to respectively indicate when the switches 106, 397, 401, 411 and 383 are open to facilitate locating the malfunction.

A modified form of head designated 25' is illustrated in FIGS. 20 and 21 in the embodiment described, the head 25' includes a jaw mounting frame 235' and a jaw actuator frame 236' mounted for limited vertical lost motion relative to the mounting frame. The mounting frame 235' includes a bar 237' having the guide rods 238 attached to opposite ends. Jaw mounting plates 247' are attached to the bar 235' and cooperating pairs of container engaging jaws 256' and 257' are mounted on the plates 247'. As shown, jaws 256' are stationary and jaws 257' are pivotally mounted on pins 258' on the plates 247'. The actuator frame 236' includes a bar 265' vertically movable relative to the jaw mounting frame, and which bar is connected by rods 266' to arms 276' on the movable jaws 257' to open the jaws when the bar 236' is lowered as shown in FIG. 20 and to close the jaws when the bar 236' is raised relative to the jaw mounting frame, as shown in FIG. 21. As in the preceding embodiment, a rod 280 is attached to the actuator frame 236' and slidably extends through the bar 237'. The aforementioned latches 289 are attached to the jaw mounting frame 235' by the bracket 288 and the keeper block 283 is attached by a pin 284 to the rod 280 for limited lost motion relative thereto. The head 25' operates in the same general manner as previously described in connection with the embodiment of FIGS. 10–12, and further detailed description is accordingly deemed unnecessary. In the form shown, the head 25' is used for elevating gable topped containers, it being apparent that the jaw could be adapted for handling other types of containers, such as the containers having a peripheral top flange previously described.

From the foregoing it is thought that the construction and operation of the device will be readily understood. The motor 91, when energized, operates to continuously move the transfer member 80 crosswise of the loading platform, and to also operate the gate release arm 138. When a preselected number of containers accumulate on the conveyor 20 in advance of the in-feed gate 22, the latch bar 115 is released and the arm 138 operates to move the latch bar to a position releasing the gate after the transfer member has been retracted. The containers C then move onto the grouping station 21 and are transferred onto the loading platform 24. As the transfer member 80 moves to its extended position, the finger 140 thereon engages the arm 137 on the gate to reclose the gate. As the last row of containers required to fill the platform is moved onto the platform by the transfer mechanism, the rearmost row of containers engages the bar 161 to operate the clutch arm 155 to its released position. The one-revolution clutch then drives the shaft 145 through one revolution to sequentially lower the head 25 into engagement with the containers on the loading platform and to pick up the head. At that time, the cam 168 moves away from the follower 166 and the springs 165 then move the loading platform out of the path of movement of the head. Continued turning of the shaft 145 lowers the head into the case and, when the downward movement of the head is arrested by engagement of the containers with the case, the container gripping jaws are operated to their released position and automatically locked in that position by the latch fingers 289. The shaft 145 then operates to raise the head and, after the head has been elevated to a level above the loading platform, the cam 168 returns the platform to its initial position. The machine continues to deposit successive layers of containers into the case until the head stops at a level adjacent the top of the case. At that time, the latch dog 358 on the sprocket 351 operates the switch 352 to release the case at the loading station, on the upstroke after the head is out of the case, and allow a succeeding case to move into position.

The case filling machine is capable of loading containers into the cases at a high rate and frequently in excess of the rate in which the containers are filled by two separate filling machines. A modified in-feed gate construction is illustrated in FIG. 22 for controlling the feeding of containers onto the grouping station 21 from either end of the grouping station, to enable containers from two separate filling machines to be combined and loaded by the casing machine. The machine is generally the same as previously described, except that a second in-feed conveyor and in-feed gate are provided at the right hand side of the machine, as viewed from the front. The in-feed conveyor 20, in-feed gate 22 and bell crank 125 at the left side of the machine remain the same as previously described and the same numerals are used to designate these parts in FIG. 22. Corresponding parts are added at the right side of the machine and substituted for the stop 88, and like numerals followed by the subscript $r$ are used to designate the in-feed conveyor 20$r$, the in-feed gate 22$r$ and the bell crank 125$r$ at the right side of the machine. Then parts are constructed and mounted in the same manner as previously described, and further detailed description is deemed unnecessary, it being understood that a second set of container detector finger (not shown) is also provided for the right hand conveyor to control movement of latch bar 115$r$.

A modified actuator is provided for operating both latch bars 115 and 115$r$ and in such a manner as to open only one in-feed gate at a time. This common actuator is generally similar to that previously described and like numerals followed by the suffix (') are used to designate the modified parts. As shown, a pair of rods designated 128' and 134' are slidably mounted in a fixed guide block 129' mounted on front frame member 38. The rod 128' is arranged to operate the left latch bar 115 and the rod 134' is connected through a lever 451 to a rod 452 which is arranged to operate the right latch bar 115$r$. As shown, the lever 451 is pivotally attached at opposite ends to the rods 134' and 452 and is pivotally mounted in intermediate its ends on a stationary bracket 453. Rod 128' has a lost motion connection to the bell crank 125 and, as shown, as a head 454 slidably received in a hollow member 455 attached to the bell crank. The head 454 is arranged to engage a stop 456 on the upper end of the member 455 to move the latch bar to its gate release position in response to an upward pull on the rod 128'. A spring 457 is disposed between the rod and the member 455 to yieldably urge the latch bar to its latch position shown in the drawings. The rod 452 similarly has a lost-motion connection to the bell crank 125$r$. However, the lever 451 moves the rod 452 downwardly when rod 134' is pulled upwardly. Accordingly, the rod 452 is provided with a head 461 which is slidable in a hollow member 462 attached to the bell crank 125$r$, and which head is arranged to engage a stop 463 on the member when the rod 452 is moved downwardly to a preselected position. A spring 465 is disposed between the head 461 and a cap 466 on the member 462 to yieldably urge the latter upwardly. As will be noted, bell crank 125$r$ is arranged to move latch bar 115$r$ to its latch position when the member 462 is moved upwardly, and to its release position when member 462 is moved downwardly.

The rods 128' and 134' slidably extend through bores in an actuator block 133' which is elevated and lowered by the arm 138 in timed relation with the movement of the transfer member, as previously described. The actuator block 133' engages stop collars 467 and 468 on the rods 128' and 134' as the block moves downwardly (during inward movement of the transfer member 23), and moves the rods downwardly to the position shown in FIG. 22 until a second set of stop collars 469 and 470 on the rods engage the fixed guide block 129'. When the actuator block reaches its lowermost position as shown in the drawings, ball detents 135 and 135' seat in notches 136 and 136' in the rods 128' and 134' respectively. When the actuator block 133' is thereafter moved upwardly (during retraction of the transfer member 23) the ball detents tend to elevate both rods 128' and 134'. In order to effect opening of only one gate at a time, the head such as 454 on one rod 128' is arranged to engage its stop 456 to urge the latch bar 115 to its release position before the head 461 on the other rod engages its stop 463 to urge the other latch bar 115$r$ toward its release position. An interlock bar 472 is slidably mounted on the guide block 129' and has noses 473 and 474 at opposite ends that are adapted to project into notches 475 and 476 in the rods 128' and 134'. If enough containers are present on the left conveyor 20 to release the latch bar 115, the rod 128' will move upwardly with the actuator block 133'. The notch 475 in the rod 128' is formed with a cam face 475$a$ which is operative upon upward movement of the rod 128' to shift the interlock bar 472 to the left, so that the nose 474 on the interlock bar will project into notch 476 and engage a stop face 476$a$ therein to lock the rod 134' against further upward movement. The lost-motion between the head 461 on rod 452 and its stop 463 is made sufficient to accommodate the initial upward movement of rod 134', that is until the stop face 476$a$ engages the interlock bar. Therefore, the right latch bar will not be operated to its release position if the left latch bar is operated to its release position. However, if there are not enough containers on the left in-feed conveyor 20, then rod 128' cannot be raised and ball detent 135 will release. The interlock bar 472 will then remain in its left position shown, and rod 134' can then be raised by the actuator block, provided there are enough containers on the right conveyor 20$r$ to release the latch bar 115$r$. If there are insufficient containers on both conveyors 20 and 20$r$, then both ball detents 135 and 135' will release. During subsequent downward movement of the actuator block 133', a cam face 476$b$ in notch 476 engages the nose 474 on the interlock bar to return it to its left position shown in the drawings. Thus, the actuator block will first attempt to move the left latch bar to its release position and will thereafter move the right latch bar to its release position only if insufficient containers are present on the left conveyor. Since the casing machine operates at a rate in excess of the combined rates at which containers are fed to the left and right conveyors, there will be no substantial accumulation of containers on the right conveyor.

In loading certain types of containers into a case, it is desirable to deposit one less row of containers in certain layers in the case to facilitate "nesting" of the containers in the case. Thus, in loading gable top milk containers shown at "C" in FIG. 23, it is necessary to skip one row in one layer of either the pint or half-pint containers to enable nesting of the containers in the case 26 sufficient to provide clearance space at the top of the case to allow stacking of the filled cases. When loaded in this manner, the cases 26 will hold three layers of the standard ½ pint size gable top containers; two layers of the standard pint size gable top containers and only one layer of the standard quart size gable top containers. In the modified construction shown in FIG. 23, provision is made for automatically loading a preselected number of rows of containers (herein shown as four rows) in the first layer and one less row in the next layer. In the event ½ pint containers are loaded which require three layers, the machine is arranged to deposit the full complement of four rows in the top layer.

The machine of FIG. 23 is generally the same as previously described and the same numerals are used to designate corresponding parts and like numerals followed by suffix ('') are used to designate modified parts. The gable top containers shown have a central flange and must be independently gripped by the head 25''. In the form shown the head 25'' is accordingly provided with sixteen pairs of gripper jaws 257'' arranged in banks of four to grip the top of the containers when the top flanges on the containers parallel the front of the machine. The head is supported on the chain 208 and operated in the manner previously described, and the sprocket 351 meshes with the chain to move to an angular position correlative with the position of the head. In this embodiment, the clutch operating arm 155'' is loosely mounted on the shaft 66 and the detector arm 162 is also loosely mounted on the shaft separate from the clutch arm. The detector arm is normally positioned as shown in FIG. 23 with the container detector bar 161'' positioned to be engaged by the containers on the loading platform when the third row of containers is advanced onto the platform. The arm 155'' has an enlarged hub or plate 481 formed with notches 482 and 483, and the detector arm 162'' has a pawl 484 pivoted thereto. The pawl is normally urged as by gravity into the notches. When it engages notch 482 it will move the clutch arm 155'' with the detector arm 162'' in response to loading three rows of containers on the platform 24. When it engages notch 483, it will move the clutch arm with the detector arm only after four rows of containers are pushed onto the loading platform. A selector plate 485 is also loosely mounted on the shaft 66 and has a nose portion 486 operative in one position (shown in FIG. 23) to prevent movement of the pawl 484 into the first notch 482. An operator such as a solenoid 487 is connected through a link 488 to the selector plate 485 to selectively move the same to a position in which the nose 486 uncovers the first notch 482 to allow the pawl to drop into the first notch and operate the clutch lever in response to advancement of only three rows of containers onto the loading platform.

Provision is made for automatically operating the solenoid 487 in accordance with the position of the head 25'' when it is lowered into the case 26 to thereby load one less row in the second layer of half-pint containers or one less row in the top layer of pint containers. For this purpose, a normally open switch 491 is mounted adjacent the sprocket. A third lever 492 is mounted for turning movement about the axis 355 and has a nose at its outer end spaced radially further from the axis than either of the levers 354 or 365. The lever is normally urged, as by gravity, against a stop 493 with its nose positioned intermediate the angular position the dog 358 reaches (shown in phantom in FIG. 23) when the head lowers the first layer of half-pint or pint containers into the case and the angular position the dog reaches when it deposits the second layer of half-pint or pint containers in the case. The dog 358 will therefore move past the lever 492 when the head is lowered to deposit the first layer of half-pint or pint containers in the case, and, during upward movement of the head, the dog will engage and turn the lever 492 therewith in a clockwise direction. The lever has a notched switch operating finger 493 which engages the actuator on the switch 491 and closes the switch. The switch actuator seats in the notch in the finger 493 and holds the lever in its switch closing position until the head 25'' is thereafter lowered to deposit the second layer of pints or half-pints. At that time, the dog engages the lever 492 and moves it counter-clockwise back to the position shown in FIG. 23. The switch 491 is connected in a series circuit 497 with the solenoid 487 to the aforedescribed power conductors 381 and 382, to energize the same during the time interval between raising the head after depositing the first layer in the case and lowering of the head to deposit the second layer in the case. As previously described, the solenoid, when energized moves the selector plate 485 to a position uncovering the first notch 482 in the plate 481 so that the clutch arm is thereafter tripped to deposit the second layer in the case when only three rows of containers have been pushed onto the platform. When the three rows of containers are lowered into the case, they tend to shift or tilt laterally to a "nested" position somewhat as shown in the drawings. A spring 157'' is provided for returning the clutch lever 155'' to its normal clutch disengaging position. A means, such as a finger 496 on the swingable tray support arm 64, is preferably provided for holding the detector arm out of the path of movement of the head while the tray is in its displaced position shown in FIG. 8. A pawl stop 498 is provided to engage the pawl after the clutch arm 155'' has been tripped to release the detector arm from the clutch arm. While the machine has been specifically described as depositing four rows of gable top containers in the first layer and three rows in the second layer, it is apparent that the machine could be adapted to deposit relatively different numbers of containers in the successive layers, depending on the size and shape of the containers and case and that, moreover, the machine can also be adapted to handle containers of a type different from that specifically described herein.

I claim:

1. A case filling machine comprising, a support frame, a container loading platform, a case loading station below said platform for supporting a case for the containers, means for stacking a group of containers on the loading platform, a container pick-up head, head elevating means including an elongated flexible member having one end portion operatively connected to said head, roller means mounted on said frame above said platform, said flexible member extending upwardly from said head over said roller means and having means anchoring the other end portion of the flexible member to said frame for normally supporting said head in an initial position spaced above the containers on said loading platform, said head elevating means including cam actuated means engaging said flexible member intermediate said roller means and said other end portion forming a loop in said flexible member and operable when driven to change the effective length of said loop and move said head through a cycle to sequentially lower said head into engagement with the containers on the platform; raise the head to elevate the containers above the platform; lower the head to a position below said platform to load the containers in a case at the case loading station; and return the head to said initial position; means operative when a preselected number of containers are stacked on the platform for driving said cam actuated means through said cycle, means on said head operable to grip the containers when head is lowered into engagement with the containers on the loading platform and to release the containers when the containers are lowered into the case, and means operative in timed relation with said elevating means for moving said loading platform out of the path of movement of said head when the containers are lifted off the platform.

2. The combination of claim 1 wherein said anchor means is adjustable relative to said frame for adjusting the initial position of the head to accommodate containers of different height.

3. A case filling machine comprising, a container loading platform, a case loading station below said container loading platform for supporting a case, means for stacking a group of containers on said loading platform, a container pick-up head, head elevating means including a flexible element operatively connected to said head for normally supporting said head in an initial position spaced above the containers on said loading platform, said head elevating means including a drive shaft, an annular stationary cam track around said drive shaft; a cam follower connected to said shaft for movement thereby around said cam track; and a follower wheel connected to said cam follower for movement therewith and engaging said flexible element intermediate its ends, said cam track being shaped to shift said follower wheel during each revolution of the cam shaft to move the head through a cycle and sequentially lower the head into engagement with the containers on the paltform; raise the head to elevate the containers above the platform; lower the head into a case at the case loading station; and return the head to said initial position, and means operative when a preselected number of containers are stacked on said loading platform for driving said cam shaft through one revolution, means on said head operable to grip the containers when the head is lowered into engagement with the containers on the loading platform and operable to release the containers when the containers are lowered into a case.

4. A case filling machine comprising, a container loading platform, a case loading station below said container loading platform for supporting a case, means for stacking a group of containers on said loading platform, a container pick-up head, head elevating means including a flexible element operatively connected to said head for normally supporting said head in an initial position spaced above the containers on said loading platform, said head elevating means including a drive shaft, an annular stationary cam track around said drive shaft; a cam follower connected to said shaft for movement thereby around said cam track; and a follower wheel connected to said cam follower for movement therewith and engaging said flexible element intermediate its ends, said cam track being shaped to shift said follower wheel during each revolution of the cam shaft to move the head through a cycle and sequentially lower the head into engagement with the containers on the platform; raise the head to elevate the containers above the platform; lower the head into a case at the case loading station; and return the head to said initial position, and cam means on said cam shaft for moving said loading platform out of the path of movement of said head when the containers are lifted off the platform.

5. The combination of claim 4 including means connected to said flexible element for adjusting the effective length of said element to accommodate containers of different height.

6. A case filling machine comprising, a container loading station, a case loading station, a container pick-up head having relatively movable container gripping jaws, a member supported on said head for limited vertical lost-motion relative to said head, head elevating means connected to said member and normally supporting said head in an initial position spaced above the containers at the loading station, drive means connected to said elevating means to sequentially lower the head into engagement with the containers at the container loading station; elevate the head to raise the containers off the container loading station; lower the head to position the containers in a case at the case loading station; and thereafter return the head to said initial position, jaw operating means on said head operatively connected to said member for moving the jaws into container gripping position in response to raising of said member relative to said head when said elevating means elevates said head at said container loading station and operative to move the jaws to container release position in response to lowering of said member relative to said head when downward movement of the head is arrested by the containers coming to rest in the case.

7. A case filling machine comprising, a container loading station, a case loading station, a container pick-up head having relatively movable container gripping jaws, a member supported on said head for limited vertical lost-motion relative to said head, jaw operating means connected to said member and operative in response to upward movement of the member relative to the head for closing the jaws and operative in response to downward movement of the member relative to the head for opening the jaws, head elevating means connected to said member and normally supporting said head in an initial position spaced above the containers at the loading station, drive means connected to said elevating means to sequentially lower the head into engagement with the containers at the container loading station; elevate the head to raise the containers off the container loading station; lower the head to position the containers in a case at the case loading station; and thereafter return the head to said initial position, latch means on said head and member operative to releasably latch said member in a lowered position relative to said head when the head is at the case loading station to hold the jaws in open position, and means at said container loading station operative in response to arresting of downward movement of the head by engagement with the containers at the container loading station for releasing said latch means.

8. A case filling machine comprising, a container loading station, a case loading station, a container pick-up head for picking up containers at the container loading station and for lowering the containers into a case at the case loading station, said head having opposed pairs of container engaging jaws, at least one jaw of each pair being mounted for opening and closing movement relative to the head toward and away from the other jaw of the respective pair of jaws, a member supported for limited vertical lost-motion relative to the head, jaw operating means connected to said member and operative in response to upward movement of the member relative to the head for closing the jaws and operative in response to downward movement of the member relative to the head for opening the jaws, head elevating means connected to said member to suspend the head therefrom whereby to normally move the member upwardly relative to the head and close the jaws, latch means for latching said jaws in open position when said member moves downwardly relative to said head incident to arresting of downward movement of the head when the containers come to rest in a case, said latch means being arranged to maintain the jaws latched in their open position during subsequent elevating of the head by said elevating means and so long as the weight of the head is supported by said member, means yieldably engaging said latch means when the head is adjacent said container loading station for moving said latch means to a release position when the downward movement of the head is arrested by engagement with the containers at the container loading station and the weight of the head is momentarily supported by the containers at the container loading station.

9. A case filling machine comprising, a container loading platform, a case loading station below said container loading platform, conveyor means for advancing a row of containers to a grouping station alongside said platform, container transfer means mounted for movement crosswise of said grouping station for moving groups of containers from the grouping station onto said container loading platform, drive means, a first drive shaft connected to said drive means and having a first cam-means thereon for cyclically moving said transfer means crosswise of the grouping station and back at least once during each revolution of said first shaft, a container pick-up head, a second drive shaft, a one-revolution clutch operative to drivingly connect said second shaft to said first shaft for rotation thereby through one revolution, means responsive to accumulation of a preselected number of containers on the loading platform for operating said clutch to drivingly connect said second shaft to said first shaft, and head elevating means operatively connected to said second shaft for raising and lowering said head to transfer containers from the container loading platform to a case at the case loading station.

10. A case filling machine comprising, a container loading platform, a case loading station below said container loading platform, conveyor means for advancing a row of containers to a grouping station alongside said platform, container transfer means mounted for movement crosswise of said grouping station for moving groups of containers from the grouping station onto said container loading platform, drive means, a first drive shaft connected to said drive means and having a first cam means thereon for cyclically moving said transfer means crosswise of the grouping station and back at least once during each revolution of said first shaft, a container pick-up head, a second drive shaft, a one-revolution clutch operative to drivingly connect said second shaft to said first shaft for rotation thereby through one revolution, means responsive to accumulation of a preselected number of containers on the loading platform for operating said clutch to drivingly connect said second shaft to said first shaft, and a second cam means on said second shaft operative to move said container loading platform out of the path of movement of the head when said head is lowered.

11. A case filling machine comprising, a frame, container loading platform, a case loading station below said platform for supporting a case to be filled, conveyor means for advancing containers to grouping station alongside said platform, a transfer member, means including a first arm pivotally mounted on said frame for supporting said transfer member for movement crosswise of said grouping station to transfer containers from the grouping station onto the loading platform, a container pick-up head for transferring containers from the loading platform to a case at the loading station, means including a second arm pivotally mounted on said frame for supporting said loading platform for movement into and out of the path of movement of said head, drive means, a first drive shaft connected to said drive means and having a first cam means thereon for cyclically moving said transfer member crosswise of the grouping station and back at least once during each revolution of said first shaft, a second drive shaft, a one-revolution clutch operative to drivingly connect said second shaft to said first shaft for rotation thereby through one revolution, means responsive to accumulation of a preselected number of containers on said loading platform for operating said clutch to drivingly connect said second shaft to said first shaft, a second cam means on said second shaft operative to swing said container loading platform out of the path of movement of said head when said second shaft is rotated, and means for raising and lowering said head to transfer containers from said loading platform to a case at said loading station.

12. A case filling machine comprising, a frame, container loading platform, a case loading station below said platform for supporting a case to be filled, conveyor means for advancing containers to grouping station alongside said platform, a transfer member, means including a first arm pivotally mounted on said frame for supporting said transfer member for movement crosswise of said grouping station to transfer containers from the grouping station onto the loading platform, a container pick-up head for transferring containers from the loading platform to a case at the loading station, means including a second arm pivotally mounted on said frame for supporting said loading platform for movement into and out of the path of movement of said head, drive means, a first drive shaft connected to said drive means and having a first cam means thereon for cyclically moving said transfer member crosswise of the grouping station and back at least once during each revolution of said first shaft, a second drive shaft, a one-revolution clutch operative to drivingly connect said second shaft to said first shaft for rotation thereby through one revolution, means responsive to accumulation of a preselected number of containers on said loading platform for operating said clutch to drivingly connect said second shaft to said first shaft, a second cam means on said second shaft operative to swing said container loading platform out of the path of movement of said head when said second shaft is rotated, and a third cam means connected to said second shaft to be driven thereby through a cycle to sequentially lower said head into engagement with the containers on the loading platform; raise the head to lift the containers off the platform; lower the head to position the containers in a case at the case loading station; and return the head to a position above the loading platform.

13. A case filling machine comprising, a frame, container loading platform, a case loading station below said platform for supporting a case to be filled, conveyor means for advancing containers to grouping station alongside said platform, a transfer member, means including a first arm pivotally mounted on said frame for supporting said transfer member for movement crosswise of said grouping station to transfer containers from the grouping station onto the loading platform, a container pick-up head for transferring containers from the loading platform to a case at the loading station, means including a second arm pivotally mounted on said frame for supporting said loading platform for movement into and out of the path of movement of said head, drive means, a first drive shaft connected to said drive means and having a first cam means thereon for cyclically moving said transfer member crosswise of the grouping station and back at least once during each revolution of said first shaft, a second drive shaft, a one-revolution clutch operative to drivingly connect said second shaft to said first shaft for rotation whereby through one revolution, means responsive to accumulation of a preselected number of containers on said loading platform for operating said clutch to drivingly connect said second shaft to said first shaft, a second cam means on said second shaft operative to swing said container loading platform out of the path of movement of said head when said second shaft is rotated, a flexible element connected to said head for normally supporting said head in an initial position spaced above the containers on the container loading platform, an annular stationary cam track around said second drive shaft, a cam follower connected to said second shaft for movement thereby around said cam track, a follower wheel connected to said cam follower for movement therewith and engaging said flexible element intermediate its ends, said cam track being shaped to shift said follower wheel during each revolution of said second shaft and thereby move the head through a cycle to sequentially lower the head into engagement with the containers on the platform; raise the head to elevate the containers above the platform; lower the head into a case at the case loading station; and return the head to said initial position thereof.

14. A case loading machine comprising, a container loading platform, conveyor means for advancing containers to a grouping station extending alongside said platform, transfer means movable crosswise of said grouping station for transferring groups of containers onto the loading platform, an in-feed gate mounted for movement into and out of a closed position extending crosswise of said conveyor means in advance of said grouping station for interrupting movement of the containers on the conveyor means to the grouping station, a control member operatively connected to said gate for controlling movement of the gate, container detector means disposed alongside said conveyor means for locking said control member against movement and operative in response to accumulation of a preselected group of containers on said conveyor means in advance of said gate to release said control member, drive means for cyclically moving said transfer means, and means operative when said detector means releases said control member for moving said control member to a position opening said gate.

15. A case loading machine comprising, a container loading platform, conveyor means for advancing containers to a grouping station extending alongside said platform, transfer means movable crosswise of said grouping station for transferring groups of containers onto the loading platform, an in-feed gate mounted for movement into and out of a closed position extending crosswise of said conveyor means in advance of said grouping station for interrupting movement of the containers on the conveyor means to the grouping station, a control member operatively connected to said gate for controlling movement of the gate, container detector means disposed alongside said conveyor means for locking said control member against movement and operative in response to accumulation of a preselected group of containers on said conveyor means in advance of said gate to release said control member, drive means connected to said transfer means for cyclically moving said transfer means, and means connected to said drive means and operative when said detector means releases said control member for moving said control member in timed relation with the movement of said transfer means to a position opening said gate.

16. A case loading machine comprising, a container loading platform, conveyor means for advancing containers to a grouping station extending alongside said platform, transfer means movable crosswise of said grouping station for transferring groups of containers onto the loading platform, an in-feed gate mounted for movement into and out of a closed position extending crosswise of said conveyor means in advance of said grouping station for interrupting movement of the containers on the conveyor means to the grouping station, a control member connected to said gate for latching said gate in said closed position, container detector means disposed alongside said conveyor means for locking said control member against movement out of its gate latching position and operative in response to accumulation of a preselected group of containers on said conveyor means in advance of said gate for releasing said control member, drive means connected to said transfer means for cyclically moving said transfer means to extend and retract the same across said grouping station, means connected to said drive means and operative when said control member is released for moving said control member out of its gate latching position, and means responsive to extension of said transfer means for moving said gate back to its closed position.

17. The combination of claim 16 wherein said control member extends alongside said conveyor means, said detector means including a plurality of individual latch fingers mounted at spaced points along the conveyor means and each engaging said control member, said latch fingers being individually movable out of engagement with said control in response to engagement with a container on said conveyor means.

18. A case filling machine comprising, a frame, container loading platform, a case loading station below said platform for supporting a case to be filled, conveyor means for advancing containers to grouping station alongside said platform, a transfer member, means including a first arm pivotally mounted on said frame for supporting said transfer member for movement crosswise of said grouping station to transfer containers from the group station onto the loading platform, a container pick-up head for transferring containers from the loading platform to a case at the loading station, means including a second arm pivotally mounted on said frame for supporting said loading platform for movement into and out of the path of movement of said head, drive means, a first drive shaft connected to said drive means and having a first cam means thereon for cyclically moving said transfer member crosswise of the group station and back at least once during each revolution of said first shaft, a second drive shaft, a one-revolution clutch operative to drivingly connect said second shaft to said first shaft for rotation thereby through one revolution, means responsive to accumulation of a preselected number of containers on said loading platform for operating said clutch to drivingly connect said second shaft to said first shaft, a second cam means on said second shaft operative to swing said container loading platform out of the path of movement of said head when said second shaft is rotated, and means for raising and lowering said head to transfer containers from said loading platform to a case at said loading station, an in-feed gate mounted for movement into and out of a closed position extending crosswise of said conveyor means in advance of said grouping station, container detector means disposed alongside said conveyor means for locking said gate against opening movement and operative in response to accumulation of a preselected number of containers on the conveyor means in advance of said gate to unlock said gate, and means operated by said first drive shaft for opening said gate when the gate is unlocked.

19. A case filling machine comprising, a container loading platform, a case loading station below said platform for supporting a case to be filled, conveyor means for advancing containers to be filled to a grouping station alongside said platform, a transfer member mounted for movement crosswise of the grouping station for transferring containers onto the platform, a first drive means operative to continuously cycle said transfer means crosswise of the grouping station, an in-feed gate extending crosswise of the conveyor means for interrupting the advance of containers onto the grouping station, means responsive to accumulation of a preselected number of containers on the conveyor means in advance of said grouping station and operative in tmied relation with the movement of said transfer means for opening said gate to allow a group of containers to advance to the grouping station, a container pick-up head, a second drive means for raising and lowering said head to transfer containers from the loading platform to a case at the case loading station, means responsive to accumulation of a preselected number of containers on the loading platform for operating said second drive means, and means operated in timed relation with said second drive means for moving said loading platform out of the path of movement of said head.

20. A case filling machine comprising, a container loading station, a case loading station, a head for picking up groups of containers at the container loading station and for lowering the same into a case at the case loading station, means supporting a case for movement along a generally horizontal path to said case loading station, front, rear and opposed side container guide flaps, means mounting the front and rear flaps for swinging movement about generally horizontal axes extending crosswise of the case support means above the level of the tops of the cases on the support means and spaced apart a distance greater than the length of the case, means mounting said side flaps for swinging movement about generally horizontal axes extending transverse to the axes of said front and rear flaps, said front flap normally swinging downwardly into the path of movement of the top of the case on the case support means to be pushed upwardly as the case moves to the case loading station, said flaps each having arm portions extending from opposite ends, the arm portions on the front flap underlying the arm portions on the adjacent ends of said side flaps to swing the side flaps upwardly in response to upward swinging of the front flap and the arm portions on the other ends of the side flaps underlying the arm portions on the rear flap to swing the rear flap upwardly in response to raising of the side flaps.

21. A case filling machine comprising, a container loading station, a case loading station, a head for picking up groups of containers at the container loading station and for lowering the same into a case at the case loading station, means supporting a case for movement along a generally horizontal path to said case loading station, front, rear and opposed side container guide flaps, means mounting the front and rear flaps for swinging movement about generally horizontal axes extending crosswise of the case support means above the level of the tops of the cases on the support means and spaced apart a distance greater than the length of the case, means mounting said side flaps for swinging movement about generally horizontal axes extending transverse to the axes of said front and rear flaps, said front flap normally swinging downwardly into the path of movement of the top of the case on the case support means to be pushed upwardly as the case moves to the case loading station, said flaps each having arm portions extending from opposite ends, the arm portions on the front flap underlying the arm portions on the adjacent ends of said side flaps to swing the side flaps upwardly in response to upward swinging of the front flap and the arm portions on the other ends of the side flaps underlying the arm portions on the rear flap to swing the rear flap upwardly in response to raising of the side flaps, means at said case loading station for stopping a case at said case loading station, means connected to at least one of said flaps for interrupting downward movement of said loading head when the flaps are not properly positioned in a case.

22. A case filling machine comprising a container loading platform, means defining a container grouping station adjacent one side of said loading platform, first and second conveyor means for advancing rows of containers onto said grouping station from relatively opposite directions, first and second in-feed gates for controlling movement of containers from said first and second conveyor means to said grouping station, transfer means for moving groups of containers from the grouping station onto said loading platform, means operated in time relation with said transfer means for opening only one of said in-feed gates at a time, and means responsive to accumulation of a preselected number of rows of containers on said loading platform for transferring the containers from the loading platform into a case.

23. A case filling machine comprising a container loading platform, means defining a container grouping station adjacent one side of said loading platform, first and second conveyor means for advancing rows of containers onto said grouping station from relatively opposite directions, first and second in-feed gates for controlling movement of containers from said first and second conveyor means to said grouping station, transfer means for moving groups of containers from the grouping station onto said loading platform, means individual to each of said first and second conveyor means for detecting when a preselected number of containers accumulate on each conveyor means; means operated in timed relation with said transfer means for opening said first in-feed gate if said preselected number of containers have accumulated on the first conveyor means or alternatively for opening said second in-feed gate if an insufficient number of containers have accumulated on said first conveyor means, and said preselected number have accumulated on said second conveyor means, and means responsive to accumulation of a preselected number of rows of containers on said loading platform for transferring the containers from the loading platform into a case.

24. A case loading machine comprising, a container loading platform, means defining a container grouping station adjacent one side of said loading platform, first and second conveyor means for advancing containers onto said grouping station, first and second in-feed gates for controlling movement of the containers from said first and second conveyor means to said grouping station, transfer means for transferring groups of containers from said grouping station onto said loading platform, first and second gate control means for respectively locking said first and second in-feed gates against opening movement when the number of containers on the respective conveyor means is less than a preselected number, common operating means for opening whichever gate is unlocked in timed relation with the movement of said transfer means, and means responsive to accumulation of a preselected number of rows of containers on said loading platform for transferring containers from the loading platform to a case.

25. A case filling machine comprising a loading platform, transfer means for transferring successive rows of containers onto the loading platform to accumulate a number of rows into a layer of containers, a container pick-up head, head elevating means operable through a cycle for moving said head to transfer the layer of containers from the loading platform into a case, and means for operating said head elevating means through one cycle in response to accumulation of a preselected number of rows on the loading platform and for operating said head elevating means through a subsequent cycle in response to accumulation of a relatively different number of rows of containers on the loading platform whereby to deposit relatively different number of containers in different layers in the case.

26. A case filling machine comprising a loading platform, transfer means for transferring successive rows of containers onto the loading platform to accumulate a number of rows into a layer of containers, a container pick-up head, head elevating means operable through a cycle for moving said head to transfer the layer of containers from the loading platform into a case, drive means including a one-revolution clutch for driving said head elevating means through one cycle, means including a selector device operative in a first position of the device to trip said clutch in response to accumulation of a preselected number of rows on the loading platform and operative in a second position of the device to trip said clutch in response to accumulation of a relatively different number of rows on the loading platform, said selector device being initially positioned in said first position whereby to trip the clutch and transfer a first layer containing said preselected number of rows of containers into the case, and means responsive to transferring of said first layer into the case for moving said selector device to said second position whereby to trip the clutch and transfer a subsequent layer containing said relatively different number of containers into the case.

27. A case filling machine comprising, a container loading platform, case conveyor means below said platform for advancing cases along a path below said platform, stop means for stopping a case on said conveyor means at a case loading station below said platform, a container pick-up head, head elevating means for moving said head to pick up containers from the platform and to lower containers into a case at said loading station, case release means for releasing said stop means, means including a switch for operating said case release means, a switch operator adapted when moved in one direction to operate said switch, actuator means operatively connected to said head elevating means for movement correlative with the movement of the head, said actuator means including a dog movable past said switch operator when the head is lowered and engageable with the switch operator as the head is raised to move said operator in said one direction to operate the switch, and means engageable with said dog when the head moves down below a preselected level for preventing said dog from engaging said actuator upon subsequent raising of the head to allow depositing of a succeeding layer of containers in the case.

28. A case filling machine comprising, a container loading platform, means for transferring successive rows of containers onto the loading platform to accumulate a number of rows into a layer of containers, a container pick-up head, case conveyor means below said platform for advancing cases along a path below said platform, stop means for stopping a case at a case loading station below said platform, head elevating means including drive means operable through a cycle for moving said head to transfer the layer of containers from the loading platform into a case, means including a selector device operative in a first position of the device to operate said drive means in response to accumulation of a preselected number of rows of containers on the loading platform and operative in a second position of the device to operate said drive means in response to accumulation of a relatively different number of rows on the loading platform, said selector device being initially positioned in said first position whereby to operate the drive means and transfer a first layer containing a preselected number of rows of containers into the case, means responsive to movement of said head to a preselected lower position in the case incident to depositing a first layer in the case for moving said selector device to said second position whereby to operate the drive means and transfer a subsequent layer containing a relatively different number of containers into the case, means for releasing said case stop means, and actuator means operative when said head stops at a level adjacent the top of the case for operating said means for releasing said stop means.

29. A case filling machine comprising, a container loading station, a case loading station, a container pick-up head for picking up containers at the container loading station and for lowering the containers into a case at the case loading station, said head having a plurality of pairs of opposed container engaging jaws, at least one jaw of each pair being mounted on the head for opening and closing movement relative to the other jaw of the respective pair of jaws, a member supported for limited vertical lost-motion relative to the head, jaw operating means connected to said member and to said one of said jaws of each pair of jaws and operative in response to upward movement of the member relative to the head for closing the jaws and operative in response to downward movement of the member relative to the head to a preselected lower position for opening the jaws, head elevating means connected to said member to suspend the head therefrom whereby to normally move the member upwardly relative to the head and close the jaws, latch means for latching said member in said preselected lower position relative to said head, said latch means being yieldably biased toward its latched position to latch said member in said lower position relative to said head incident to arresting of downward movement of the head when the containers come to rest in a case, said latch means being arranged to maintain the member latched in said lower position closing said jaws, during subsequent elevating of said head by said elevating means and so long as the weight of the head is supported by said member, means yieldably engaging said latch means when the head is adjacent said container loading station for moving said latch means to a release position when the downward movement of the head is arrested by engagement with the containers at the container loading station.

30. The combination of claim 29 wherein said one of said jaws of each pair is pivotally mounted on said head and the other jaw of each pair is fixed to said head.

31. The combination of claim 29 wherein both jaws of each pair are pivotally mounted on said head for movement toward and away from each other.

32. The combination of claim 29 wherein each of said pairs of jaws are mounted on said head for limited floating movement relative to the other pairs of jaws and to the head to enable independent alignment of the pairs of jaws with the container.

References Cited in the file of this patent

UNITED STATES PATENTS

| | | |
|---|---|---|
| 2,249,201 | Ferguson | July 15, 1941 |
| 2,358,447 | Creamer | Sept. 19, 1944 |
| 2,760,316 | Okulitch | Aug. 28, 1956 |
| 2,834,167 | Loveridge | May 13, 1958 |
| 2,863,268 | Holstebroe | Dec. 9, 1958 |
| 2,951,323 | Haab | Sept. 6, 1960 |
| 2,957,287 | Cella | Oct. 25, 1960 |